United States Patent
Johnson et al.

(10) Patent No.: US 9,134,880 B2
(45) Date of Patent: Sep. 15, 2015

(54) SYSTEM AND METHOD FOR SUMMONING USER INTERFACE OBJECTS

(71) Applicants: William J. Johnson, Flower Mound, TX (US); Jason M. Johnson, Flower Mound, TX (US)

(72) Inventors: William J. Johnson, Flower Mound, TX (US); Jason M. Johnson, Flower Mound, TX (US)

(*) Notice: Subject to any disclaimer, the term of this patent is extended or adjusted under 35 U.S.C. 154(b) by 334 days.

(21) Appl. No.: 13/875,367

(22) Filed: May 2, 2013

(65) Prior Publication Data

US 2013/0332876 A1 Dec. 12, 2013

Related U.S. Application Data

(62) Division of application No. 13/052,095, filed on Mar. 20, 2011, now Pat. No. 8,479,110.

(51) Int. Cl.
*G06F 3/0481* (2013.01)
*G06F 3/0484* (2013.01)
*G06F 3/0488* (2013.01)

(52) U.S. Cl.
CPC .......... *G06F 3/0481* (2013.01); *G06F 3/04842* (2013.01); *G06F 3/04883* (2013.01); *G06F 3/04886* (2013.01)

(58) Field of Classification Search
CPC .................................................... G06F 3/0481
USPC ......................................... 715/862, 774, 968
See application file for complete search history.

(56) References Cited

U.S. PATENT DOCUMENTS

| | | | |
|---|---|---|---|
| 5,483,633 A | 1/1996 | Johnson | |
| 5,543,591 A | 8/1996 | Gillespie et al. | |
| 5,621,880 A | 4/1997 | Johnson | |
| 5,644,628 A | 7/1997 | Schwarzer et al. | |
| 5,692,143 A | 11/1997 | Johnson et al. | |
| 5,880,411 A | 3/1999 | Gillespie et al. | |
| 6,028,271 A | 2/2000 | Gillespie et al. | |
| 6,323,846 B1 | 11/2001 | Westerman et al. | |
| 6,380,931 B1 | 4/2002 | Gillespie et al. | |
| 6,414,671 B1 | 7/2002 | Gillespie et al. | |
| 6,731,803 B1 | 5/2004 | Aharonson et al. | |
| 6,886,138 B2 * | 4/2005 | Laffey et al. | 715/860 |
| 6,888,536 B2 | 5/2005 | Westerman et al. | |
| 6,968,511 B1 * | 11/2005 | Robertson et al. | 715/835 |

(Continued)

OTHER PUBLICATIONS

Johnson et al., U.S. Appl. No. 13/052,095, Non-Final Office Action dated Oct. 10, 2012.

(Continued)

*Primary Examiner* — Daeho Song
(74) *Attorney, Agent, or Firm* — Yudell Isidore PLLC

(57) ABSTRACT

Provided is a system and method for summoning user interface object(s) of a display to a gesture position of a user. In a pressure sensitive display embodiment, a user maintains a convenient touch position to the display, performs a summon gesture, and user interface object(s) are automatically moved to the user's touch position as requested. When a summon gesture is recognized, a user interface object, or point or interest thereof, automatically transitions to a desired position where the gesture was recognized. Objects can transition in a variety of manners. Also, a magnetic mode can be activated for virtually magnetizing objects of interest to a user's position, for example as the user touches various places on the display. A user's configurations can be stored into a cloud system for convenient access and use at a plurality of different data processing system user interfaces.

52 Claims, 16 Drawing Sheets

(56) References Cited

U.S. PATENT DOCUMENTS

| | | | |
|---|---|---|---|
| 7,339,580 | B2 | 3/2008 | Westerman et al. |
| 7,404,150 | B2 | 7/2008 | Clark et al. |
| 7,580,029 | B2 | 8/2009 | Liu et al. |
| 7,587,087 | B2 | 9/2009 | Nurmi et al. |
| 7,598,949 | B2 | 10/2009 | Han |
| 7,619,618 | B2 | 11/2009 | Westerman et al. |
| 7,656,394 | B2 | 2/2010 | Westerman et al. |
| 7,705,830 | B2 | 4/2010 | Westerman et al. |
| 7,728,821 | B2 | 6/2010 | Hillis et al. |
| 7,764,274 | B2 | 7/2010 | Westerman et al. |
| 7,782,307 | B2 | 8/2010 | Westerman et al. |
| 7,840,912 | B2 | 11/2010 | Elias et al. |
| 7,881,901 | B2 | 2/2011 | Fein et al. |
| 8,024,667 | B2 * | 9/2011 | Shaw et al. ............ 715/766 |
| 8,108,789 | B2 * | 1/2012 | Fujii et al. ............ 715/769 |
| 8,514,251 | B2 * | 8/2013 | Hildreth et al. ........ 345/635 |
| 8,549,432 | B2 * | 10/2013 | Warner ................ 715/834 |
| 8,745,535 | B2 * | 6/2014 | Chaudhri et al. ...... 715/850 |
| 8,843,529 | B2 * | 9/2014 | Han et al. ............. 707/805 |
| 8,892,997 | B2 * | 11/2014 | Louch et al. ......... 715/273 |
| 2003/0063067 | A1 | 4/2003 | Chuang |
| 2003/0195976 | A1 | 10/2003 | Shiigi |
| 2005/0028112 | A1 * | 2/2005 | Iijima ................. 715/856 |
| 2005/0210419 | A1 | 9/2005 | Kela et al. |
| 2005/0219226 | A1 | 10/2005 | Liu et al. |
| 2005/0229116 | A1 * | 10/2005 | Endler et al. ......... 715/862 |
| 2005/0275636 | A1 * | 12/2005 | Dehlin et al. ........ 345/173 |
| 2006/0086896 | A1 | 4/2006 | Han |
| 2006/0136845 | A1 * | 6/2006 | Rimas-Ribikauskas et al. ......... 715/862 |
| 2006/0143571 | A1 * | 6/2006 | Chan ................. 715/764 |
| 2006/0238518 | A1 | 10/2006 | Westerman et al. |
| 2006/0238520 | A1 | 10/2006 | Westerman et al. |
| 2006/0238521 | A1 | 10/2006 | Westerman et al. |
| 2006/0238522 | A1 | 10/2006 | Westerman et al. |
| 2007/0094620 | A1 * | 4/2007 | Park ................... 715/862 |
| 2007/0132727 | A1 * | 6/2007 | Garbow et al. ....... 345/157 |
| 2008/0029691 | A1 | 2/2008 | Han et al. |
| 2008/0180404 | A1 | 7/2008 | Han et al. |
| 2008/0307334 | A1 * | 12/2008 | Chaudhri et al. ..... 715/764 |
| 2008/0307335 | A1 * | 12/2008 | Chaudhri et al. ..... 715/764 |
| 2009/0031257 | A1 * | 1/2009 | Arneson et al. ...... 715/862 |
| 2009/0251337 | A1 * | 10/2009 | Marggraff et al. ..... 341/20 |
| 2009/0256857 | A1 | 10/2009 | Davidson et al. |
| 2009/0287680 | A1 * | 11/2009 | Paek et al. ............. 707/5 |
| 2010/0013757 | A1 * | 1/2010 | Ogikubo .............. 345/156 |
| 2010/0060599 | A1 * | 3/2010 | Kwak et al. .......... 345/173 |
| 2010/0070931 | A1 | 3/2010 | Nichols |
| 2010/0177060 | A1 | 7/2010 | Han |
| 2010/0188369 | A1 | 7/2010 | Aizawa |
| 2010/0302210 | A1 | 12/2010 | Han et al. |
| 2010/0306717 | A1 | 12/2010 | Yamada et al. |
| 2010/0313124 | A1 | 12/2010 | Privault et al. |
| 2011/0050595 | A1 | 3/2011 | Lundback et al. |
| 2011/0050640 | A1 | 3/2011 | Lundback et al. |
| 2011/0055703 | A1 | 3/2011 | Lundback et al. |
| 2011/0055729 | A1 | 3/2011 | Mason et al. |
| 2011/0063236 | A1 * | 3/2011 | Arai et al. ............ 345/173 |
| 2011/0078202 | A1 | 3/2011 | Kamibeppu |
| 2011/0163970 | A1 * | 7/2011 | Lemay ................ 345/173 |
| 2011/0196864 | A1 | 8/2011 | Mason et al. |
| 2011/0302532 | A1 | 12/2011 | Missig |
| 2012/0084689 | A1 * | 4/2012 | Ledet et al. .......... 715/769 |
| 2012/0098780 | A1 * | 4/2012 | Fujisawa et al. ...... 345/173 |

OTHER PUBLICATIONS

Johnson et al., U.S. Appl. No. 13/052,095, Interview Summary dated Feb. 20, 2013.

Johnson et al., U.S. Appl. No. 13/052,095, Notice of Allowance dated Mar. 25, 2013.

* cited by examiner

SYSTEM AND METHOD FOR SUMMONING USER INTERFACE OBJECTS

CROSS-REFERENCES TO RELATED APPLICATIONS

This application is a divisional application of application Ser. No. 13/052,095 filed Mar. 20, 2011 and entitled "System and Method for Summoning User Interface Objects". The entire specification from the aforementioned application Ser. No. 13/052,095 is included herein in original form, except for modifications resulting from a Preliminary Amendment filed Mar. 24, 2011 to modify minor errors in six paragraphs and an Amendment B filed Mar. 15, 2013 to shorten the abstract.

TECHNICAL FIELD

The present disclosure relates generally to data processing system graphical user interfaces (e.g. touch screen interface (e.g. using gestures)), and more particularly to summoning user interface objects to a convenient position of a user of the user interface.

BACKGROUND

Touch interfaces are becoming commonplace in everything from mobile data processing systems to large display touch screen interfaces. A movement away from blackboards, whiteboards and drawing boards to large data processing system touch screen displays is underway. In fact, many schools of the future may incorporate large touch screen display interfaces for instructing students.

U.S. Pat. No. 5,621,880 ("Method and apparatus for providing contextual navigation to historical data", Johnson) provides automatic focusing of a window which contains a user specified search criteria at some time in history, however objects are not summoned to the user's most convenient input location in the user interface such as the display location where a gesture is entered for object search criteria. The present disclosure is needed for bringing user interface objects to a user (in particular for very large displays), rather than forcing a user to physically navigate to a user interface object in order to interface with it. Similarly, U.S. Pat. No. 5,483,633 ("Method and apparatus for surfacing an object based on forthcoming criteria", Johnson) provides automatic surfacing of a user interface object which will contain a user specified search criteria at some time in the future, however objects are not summoned to the user's most convenient input location in the user interface such as the display location where a gesture is entered for object search criteria.

Perceptive Pixel's "Multi-touch Collaboration Wall" embodies a large pressure sensitive display with advanced multi-touch interfaces across a variety of industries. Outstanding display performance characteristics and display driver interfaces supporting data processing system software enables many different applications for use. Such displays can be manufactured quite large depending on the customers or applications. New methods are required for navigating large touch screen interfaces, in particular when a user may have to walk, or physically move, to different positions to interact with sought user interface objects. Art involved in such displays includes publications 20100302210 ("Touch Sensing", Han et al), 20100177060 ("Touch-Sensitive Display", Han), 20090256857 ("Methods Of Interfacing With Multi-Input Devices And Multi-Input Display Systems Employing Interfacing Techniques", Davidson et al), 20080180404 ("Methods Of Interfacing With Multi-Point Input Devices And Multi-Point Input Systems Employing Interfacing Techniques", Han et al), 20080029691 ("Multi-Touch Sensing Display Through Frustrated Total Internal Reflection", Han), and 20060086896 ("Multi-touch sensing light emitting diode display and method for using the same", Han). U.S. Pat. No. 7,598,949 ("Multi-touch sensing light emitting diode display and method for using the same", Han) is also relevant.

Fingerworks was a gesture recognition company innovating multi-touch products. Fingerworks was acquired by Apple Inc. Art involved includes publications 20060238521/ 20060238522 ("Identifying Contacts On A Touch Surface", Westerman et al), 20060238520 ("User Interface Gestures", Westerman et al) and 20060238518 ("Touch Surface", Westerman et al). Relevant patents include U.S. Pat. No. 7,705,830 ("System and method for packing multitouch gestures onto a hand", Westerman et al), U.S. Pat. No. 7,656,394 ("User interface gestures", Westerman et al), U.S. Pat. No. 7,764,274 ("Capacitive sensing arrangement", Westerman et al), U.S. Pat. No. 7,782,307 ("Maintaining activity after contact liftoff or touchdown", Westerman et al), U.S. Pat. No. 7,619,618 ("Identifying contacts on a touch surface", Westerman et al) and U.S. Pat. Nos. 7,339,580/6,888,536/6,323,846 ("Method and apparatus for integrating manual input", Westerman et al).

Other touch screen and gesture related art includes publication 20050210419 ("Gesture control system", Kela et al), and U.S. Pat. No. 7,840,912 ("Multi-touch gesture dictionary", Elias et al), U.S. Pat. No. 7,728,821 ("Touch detecting interactive display", Hillis et al), and U.S. Pat. No. 5,644,628 ("telecommunications terminal interface for control by predetermined gestures", Schwarzer et al).

Handwriting recognition was made popular on tablet/notebook computers as well as some personal Digital Assistance (PDA) devices through recognition of stylus strokes on a pressure sensitive detection surface. Relevant art includes publications 20050219226 ("Apparatus and method for handwriting recognition", Liu et al), 20030195976 ("Method and system for creating and sending handwritten or handdrawn messages", Shiigi), and 20030063067 ("Real-time handwritten communication system", Chuang). Relevant patents include U.S. Pat. No. 7,587,087 ("On-line handwriting recognition", Nurmi), U.S. Pat. No. 7,580,029 ("Apparatus and method for handwriting recognition", Liu et al) and U.S. Pat. No. 6,731,803 ("Points based handwriting recognition system", Aharonson et al). Finger driven interfaces, such as those above disclosed by Westerman et al incorporate similar methods for handwriting recognition with touch surface gestures.

Synaptics Inc. has also been involved in touch interface technology. Art includes U.S. Pat. Nos. 6,414,671, 6,380,931, 6,028,271, 5,880,411 and 5,543,591 ("Object position detector with edge motion feature and gesture recognition", Gillespie et al).

Those skilled in the art recognize that users can use advanced touch gestures at any display location to interface with the associated data processing system(s), and there are a variety of hardware and software configurations enabling gestures to drive a user interface. In a small touch display it may be desirable to quickly find, or focus, a user interface object which is hidden or overlaid by other objects. In a large touch display interface, it may be desirable to find user interface objects without physically moving to them to access or find them, in particular when the physical display is considerably large.

"BumpTop" is a desktop environment that simulates the normal behavior and physical properties of a real world desk. Physics is applied to various gestures for bumping and tossing objects for realistic behavior, and automatic tools enhance selecting and organizing things. BumpTop was initially targeted for stylus interaction, however multi-touch gestures have been incorporated. The BumpTop company was acquired by Google. "Real Desktop" is also a product for bringing more of a desktop reality to the traditional two dimensional computer interface desktop. It turns your desktop into a "room", and you organize your files, folders and desktop shortcuts as tiles in that room. You can drag-and-drop those tiles, or throw them into each other and watch as they bounce around. The real world metaphor implementations can cause burying documents and information just like a disorganized desk in the real world. Methods for improving the usability of some disorganized users may be needed.

SUMMARY

User interface object(s) of a display are conveniently summoned to a user's gesture position (i.e. user's display location where gesture is input) in a user interface. In a pressure sensitive display embodiment, a user performs a gesture, the gesture is recognized, and user interface object(s) are automatically moved to the user's input position as requested. In a three dimensional imaging display embodiment (e.g. U.S. Pat. No. 7,881,901 ("Method and apparatus for holographic user interface communication", Fein et al)), a user performs a gesture, the gesture is recognized, and user interface object(s) of the three dimensional navigable environment are automatically moved to the user's gesture position as requested. For simplicity, the term cursor shall be used herein to represent the point in a user interface where a user directs the user interface whether it is by gesture, stylus, pointing device (e.g. mouse) or any other method for user input.

A summon gesture can be static or dynamic. Static gestures are predefined and each is recognized for performing a particular type of command (e.g. summon command). Static gestures may be well known gestures recognized by certain processing, or as configured and saved to a dictionary for subsequent use from a library such as described by U.S. Pat. No. 7,840,912 ("Multi-touch gesture dictionary", Elias et al). A dynamic gesture is determined at the time of gesture specification and may take on so many different definitions that a gesture dictionary would not be practical. Dynamic gestures can have a seemingly infinite number of meanings, for example as recognized for a handwriting command to specify object search criteria. A static and dynamic gesture is referred to as a written gesture. For example, a written gesture may contain handwriting which is converted to a text string (i.e. the search criteria) for comparing to text of user interface objects. When a summon gesture (may be static or dynamic) is recognized, a user interface object, or point or interest thereof, automatically transitions to a desired position (display location) where the gesture was recognized. Configurations, or the gesture itself, govern how the object(s) transition to the user's position. An object's display location and orientation prior to recognizing the summon gesture is referred to as an original position, and an object's display location and orientation after being summoned is referred to as a summoned position. An appropriate display coordinate system is preferably implemented to distinguish between the minimum granulation of addressing a display location (e.g. a pixel) so as to determine with the utmost accuracy where on the display an original position, summoned position, and specific display location resides in the particular display embodiment. An original position is distinct from a summoned position most of the time. Objects can transition by a number of methods, including:

Disappearing from an original position and reappearing at the summoned position;
Visually moving across the user interface in a line at a configured speed from the original position to the summoned position;
Animating a trail from the original position to the summoned position;
Scaling the object size as it arrives to the summoned position;
Navigating the object to a point of interest for arrival to the summoned position;
Reorienting the object as it arrives to the summoned position (e.g. panning, turning about an axis, zooming an object portion);
Providing a completely different graphic representation for information associated with the object;
Exploding the view of the object or object portion (e.g. of a schematic); and/or
Performing any reasonable transformation wherein the sought object(s) are summoned to the user for enhanced viewing or subsequent interaction.

For cases where a plurality of objects are summoned, a scrollable informative list user interface object can result, so the user may manipulate results and then summon one or more objects from the list. Optionally, summoning a plurality of objects can result in summoning the objects together in a group in a configurable manner, including:

Cascade tiling of the objects for easy selection;
Scaling to smaller (or larger) iconic instances for selection;
Moving to an organized chain of objects for manipulation;
Stacking the objects, optionally with selectable portions for uniquely subsequently accessing an object; or
Performing any reasonable grouping of objects wherein the sought object(s) are summoned to the user for enhanced viewing or subsequent interaction.

Also, a magnetic mode can be activated for virtually magnetizing objects of interest to a user's position, for example as the user touches various places on a touch sensitive display. Objects of interest in the current context of the gesture (or cursor) are automatically gravitated (i.e. scaled, moved, transitioned, etc) to the gesture (or cursor) position.

Significant effort may be invested in making user interface configurations. It is therefore important to make a user's configurations available whenever needed, for example at a similar data processing system display in a different office building, or different country. The user's data processing system configurations (e.g. user interface gestures) are optionally stored into "the cloud" for convenient access and use at a plurality of different data processing system user interfaces (e.g. in different locations).

A primary advantage herein is to minimize user manipulation of a user interface for accomplishing a result. A user interface is made more convenient by bringing a user interface object to the user, rather than requiring the user to find, move to, and act on a user interface object. The user interface is made to work more for anticipating what a user wants to do in a user interface. If the user decides the object(s) were not of interest after being summoned to the user, the objects can conveniently be returned to their original position(s) (e.g. cancel/undo request) or to other position(s) desired by the user.

It is an advantage to summon objects, regardless of the underlying type of user interface environment and/or the type of cursor used for driving the user interface. Processing is disclosed for being embodied in different user interface environments. The system and method disclosed can be used in two dimensional user interfaces (e.g. touch screen gesture interface, or pointing device interface) or three dimensional user interfaces (e.g. holographic gesture interface, or pointing device holographic interface). The system and method disclosed can be used for any type of cursor involved including gestures, pointing devices, voice driven cursor position, user's touch position, user's input tool cursor position (e.g. stylus), user manipulated cursor position (e.g. mouse cursor), or any other user interface input location/position.

It is an advantage to make moving user interface objects in small or large display systems more convenient. In a small display, overlaid objects can quickly be found without navigating to find them. In a larger display, a user need not move to an object in order to interface with it. For example, a multi-monitor system supporting a plurality of monitors for a single desktop is supported. In one embodiment, a data processing system adapter contains a plurality of ports for plugging in a plurality of monitors which can be used to navigate a single desktop. Similarly, a data processing system adapter contains a plurality of ports for plugging in a plurality of monitors which can be used to navigate multiple desktops. Also, a multi-station system supporting a plurality of users to a single display system is supported. In one embodiment, a plurality of cursors are monitored simultaneously for carrying out operations of the present disclosure, for example in multi-user systems, including those of Han et al mentioned above.

Another advantage is in anticipating what a user wants to do in a user interface, and providing a proposed result for consideration. For example, objects can magnetically transition toward the user's input position (cursor position) for indicating to the user likelihood of being of interest to the user. As the user's cursor position is detected within the display interface, objects of interest gravitate toward the cursor position. The user can conveniently confirm summoning the objects.

Yet another advantage is in summoning user interface object(s) by any conceivable search criteria. For example, hand written gestures in a multi-touch/touch screen interface can be used to specify any desired search criteria for finding objects of interest.

A further advantage is allowing the user to store his configurations to a service (e.g. cloud platform) for later recalling them at another data processing system for user interface control. Consider a large multi-country company that has deployed large gesture user interface displays in meeting rooms around the world. The present disclosure enables a user to store configurations for convenient access when needed to any of those displays at different locations. Also, configurations are stored in a universal format which can be translated appropriately to different display systems so that every display need not be exactly the same. The user may store any useful data processing system configurations which can be reused when needed at any data processing system the user encounters during his travels.

Yet another advantage is summoning user interface object(s) to a current user interface input position based on a search criteria for a particular time, such as CURRENT: search criteria matched against currently displayed user interface objects; CURRENT WITH HISTORY: search criteria matched against information to have been present at some time in the past for currently displayed user interface objects; PAST: search criteria matched against user interface objects which are not currently displayed (i.e. active at some point in the past); FUTURE: search criteria matched against newly displayed user interface objects; and SPECIFIED: search criteria specified by a user (e.g. dynamic gesture) provides date/time range for sought user interface objects that may have contained a search criteria.

A further advantage is summoning user interface object(s) to a current user interface input position using different languages. Single byte character code sets and double byte character code sets are supported so that a user can summon based on a particular language (Chinese, French, German, etc) contained in a user interface object. Also, a user can change between languages for summon search specifications to summon only those objects which contain the same language, or any objects which contain a different language that criteria has been translated for and produced a matching result. The present disclosure is fully National Language Support (NLS) enabled.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

DESCRIPTION OF DRAWINGS

The present disclosure will be described with reference to the accompanying drawings, wherein.

DETAILED DESCRIPTION

Figure 1A:
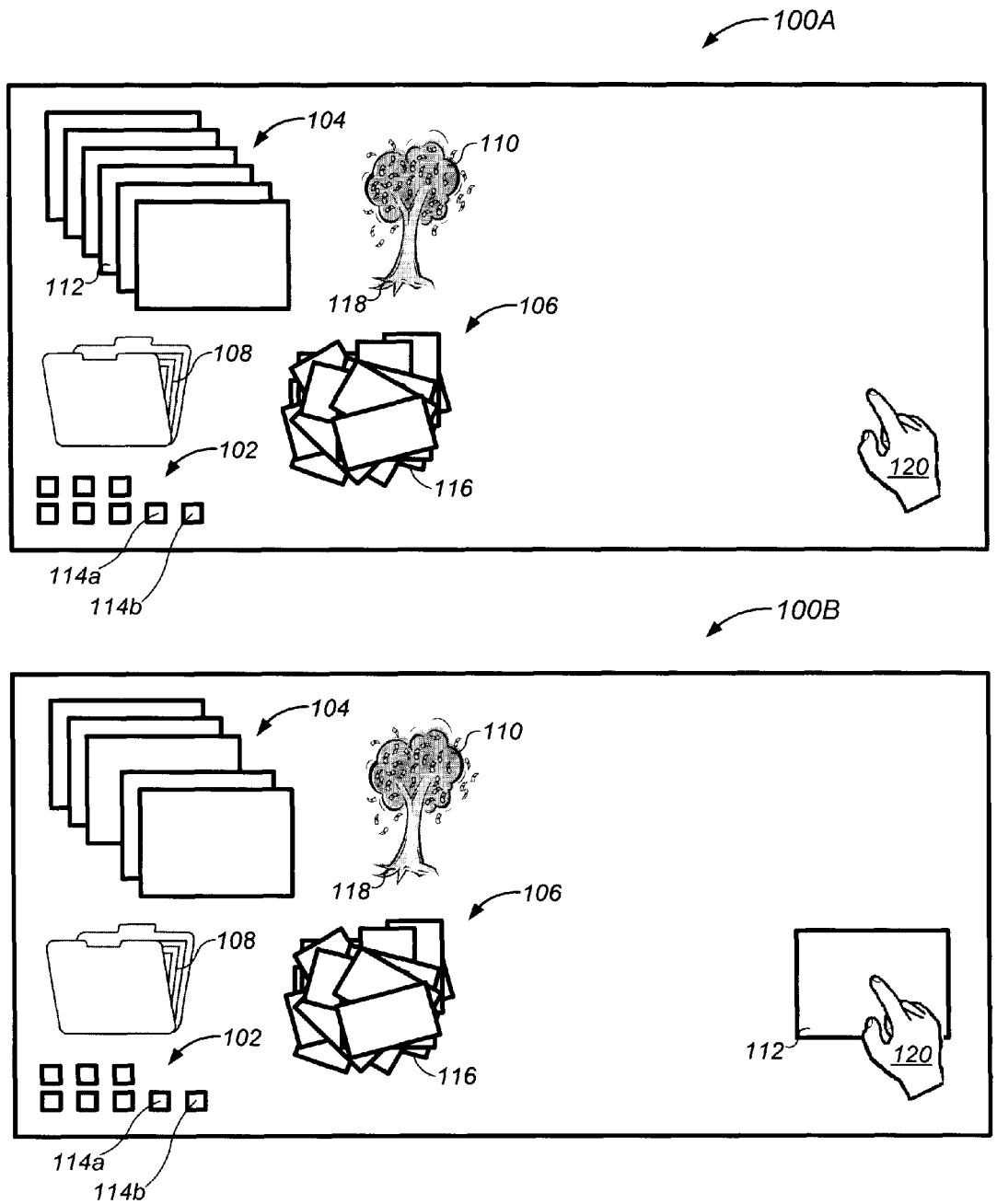
FIGS. 1A through 1F depict user interface illustrations for exemplifying summoning of user interface object(s)
Figure 1B:
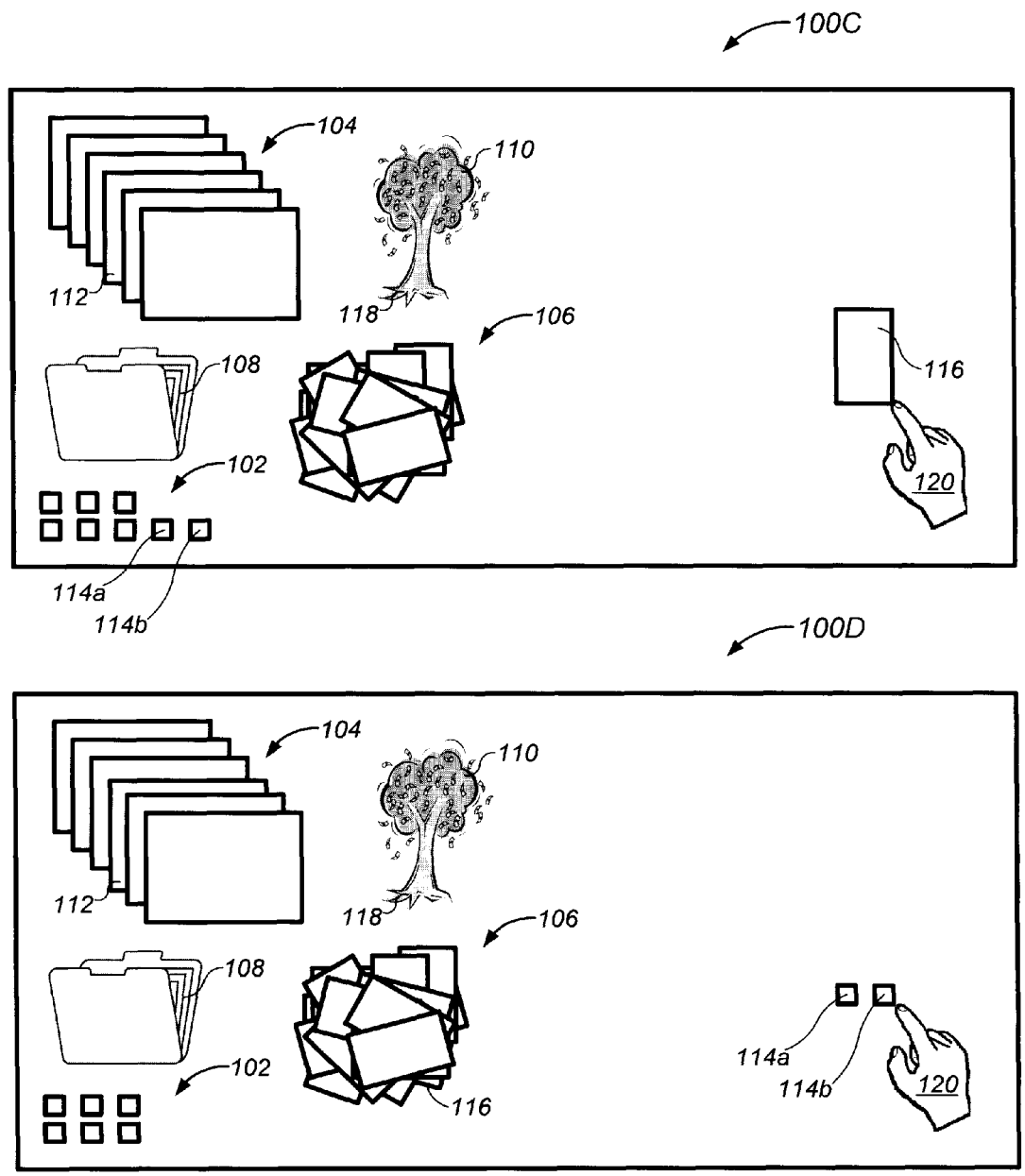
Figure 1C:
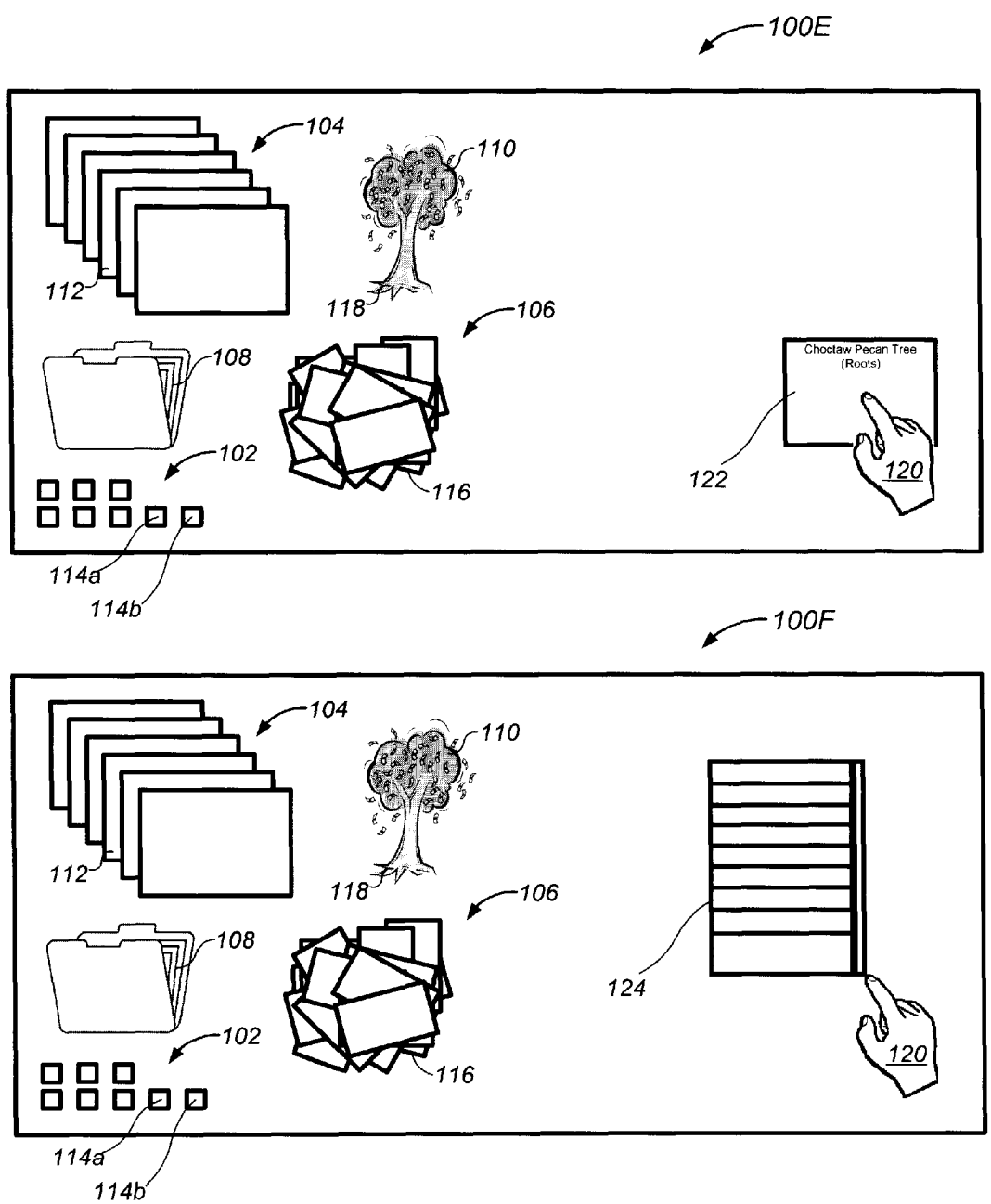

With reference now to detail of the drawings, the present disclosure is described. Obvious error handling is omitted from the flowcharts in order to focus on key aspects. A thread synchronization scheme (e.g. semaphore use) is assumed where appropriate. Flowchart processing is intended to be interpreted in the broadest sense by example, and not for limiting methods of accomplishing the same functionality. Disclosed user interface processing and/or screenshots are also preferred embodiment examples that can be implemented in various ways without departing from the spirit and scope of this disclosure. Alternative user interfaces (since this disclosure is not to be limiting) will use similar mechanisms, but may use different mechanisms without departing from the spirit and scope of this disclosure. Novel features disclosed herein need not be provided as all or none. Certain features may be isolated in some embodiments, or may appear as any subset of features and functionality in other embodiments.

FIGS. 1A through 1F depict user interface illustrations for exemplifying summoning of user interface object(s). The FIG. 1A user interface (e.g. large touch screen display 100A) contains an example starting display of current (i.e. active) user interface objects (may also be referred to as currently active user interface objects) including: a plurality of icons 102, plurality of cascaded windows 104, a heap 106 containing a plurality of documents, a folder 108 containing a plurality of files, and a window containing an animated video 110 of a pecan tree blowing in the wind. To facilitate explanation, all of the examples assume a touch screen interface wherein a user's hand 120 operates the display with touch input, for example using gestures and other touch screen manipulations. The point of touch is referred to as a cursor location on the display, and many user interface embodiments exist as described above without departing from the spirit and scope of the disclosure.

When the user specifies an object search criteria on display 100A which matches a criteria found only in window 112, window 112 is instantly and automatically moved to the user's input position. The user did not have to physically move to the objects, try to find the search criteria and then drag out window 112 to begin interfacing with it. Summon processing determined which object the user was looking for and moved the object from its original position to the user's last input position (referred to as the summoned position) as shown in display 100B. A variety of configurations or embodiments can be incorporated for how the object should be positioned with respect to the summoned position (e.g. which (e.g. x,y) coordinates to use at the summoned position when multiple coordinates are detected as being simultaneous last points of input, and how the newly position object(s) should arrive at the summoned (e.g. x,y) position (e.g. object centered, top left hand corner, scaled in size, etc)). A variety of configurations or embodiments can be incorporated for how the object transitions from the original position to the summoned position as discussed below. In one embodiment, summoned position configuration is indicated in a TR 450 (e.g. a field of fields 450j), for example to indicate what point of a summoned object coincides with which point of the last detected user input location on the display (i.e. the summoned position). An alternate embodiment may support positioning criteria being specified, or assumed, by the gesture itself.

Similarly, when the user performs a summon gesture at display 100A, display 100C may result if the search criteria determines that document 116 is being sought by the user from the heap 106. Perhaps the class of user interface object 116 indicates to uniquely transition the document 116 to the user in a different manner than if the object class of window 112 was found, for example as positioning the lower right hand corner of the document in portrait view mode to the summoned position. Similarly, when the user performs a summon gesture at display 100A, display 100D may result if the search criteria determines that icons 114a and 114b are being sought by the user. Perhaps the class of user interface objects 114a&b indicate to uniquely transition the icons to the user in a different manner than other object classes. Similarly, when the user performs a summon gesture at display 100A, display 100E may result if the user's summon gesture search criteria determines that there is an associated portion of data (e.g. linked file, exploded view containing data, hyperlink to web page, etc) to the video 110. Any of a variety of associated data may be searched and then instantly provided to the summoned position of the user in an appropriate form (may be completely different graphic representation than object being summoned) depending on the class of data, type of data, location of data, or other characteristic of the associated data. Similarly, when the user performs a summon gesture at display 100A, display 100F may result if the search criteria determines that there is a plurality of objects which match the summon gesture search criteria, and an informative scrollable list is best displayed at the summoned position so the user can in turn decide which object(s) are to be summoned.

Figure 1D:
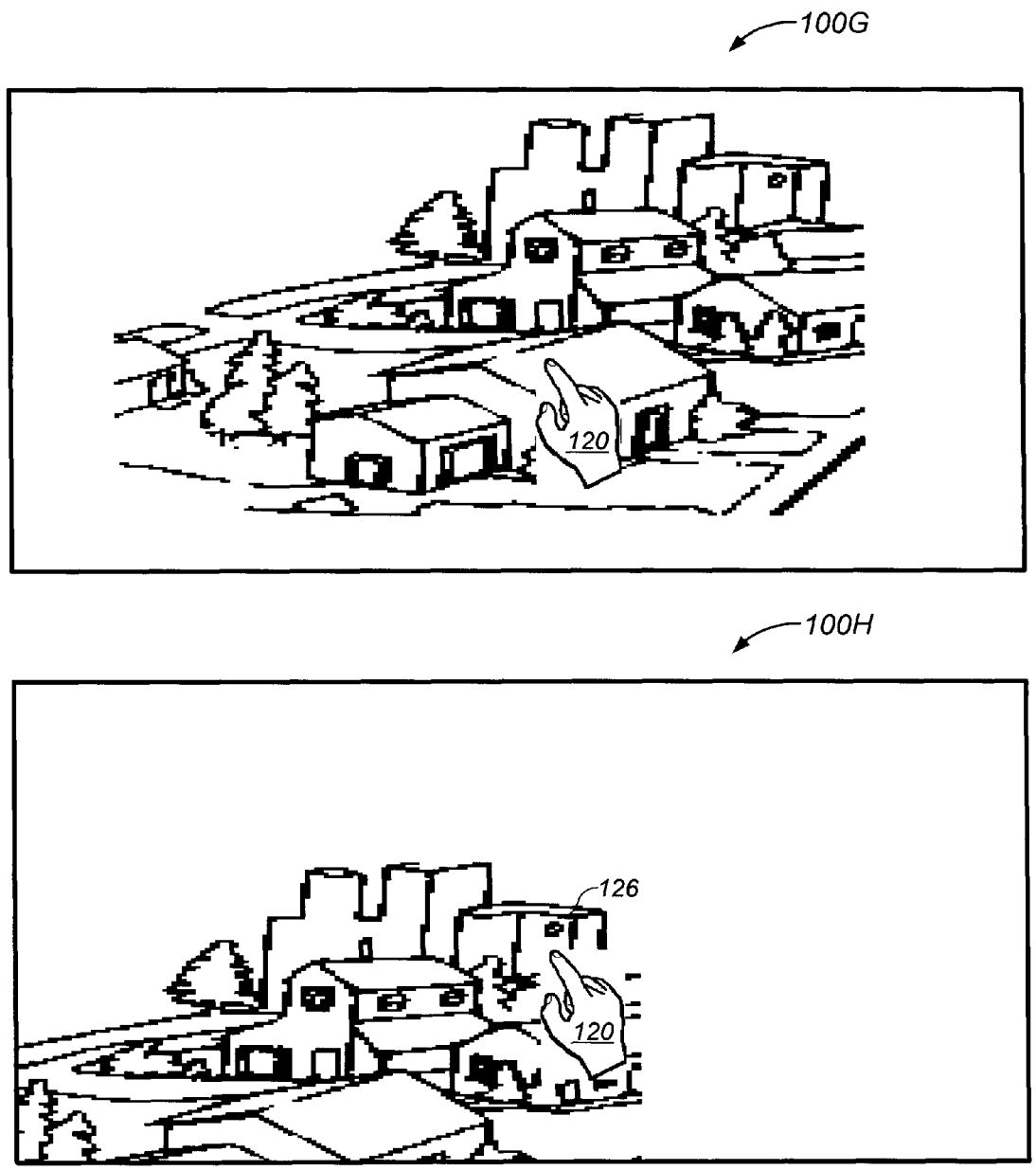

With reference now to FIG. 1D, display 100G depicts the user navigating a large map display. In one embodiment, the entire display provides a single window into manipulating the map. In another embodiment, the map is manipulated within the context of a window on the display 100G. The user can perform a summon gesture anywhere on the display for searching for criteria that is matched to data associated with the map, for example resulting in display 100H. For example, the user may have specified to summon an address on the map by hand-writing the address. Display 100H instantly results (e.g. when unique address portion recognized thereby preventing user specification of entire address (e.g. unique street number(s)) by automatically panning the building in the map with the matching address to the summoned position. Furthermore, depending on data which is associated to the map, there may be a viewing angle change, a zoom out, zoom in, axis rotation, or other graphical manipulation which should be performed in order to transition properly to the summoned position.

Figure 1E:
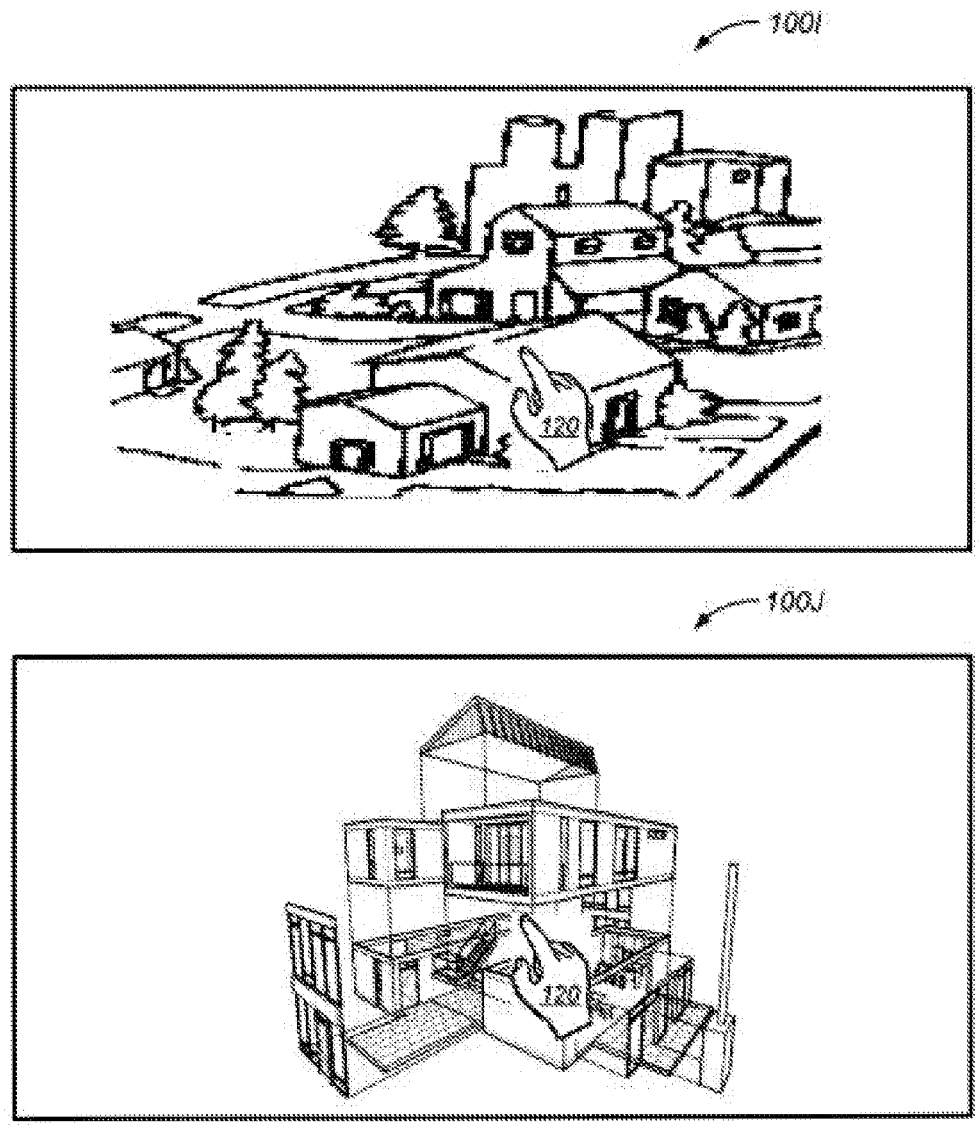

With reference now to FIG. 1E, display 100I depicts the user navigating a large map display. In one embodiment, the entire display provides a single window into manipulating the map. In another embodiment, the map is manipulated within the context of a window on the display 100I. The user can perform a summon gesture anywhere on the display for searching for criteria that is matched to data associated to the map, for example resulting in display 100J. For example, the user may have specified to summon an exploded view (e.g. a different graphic representation) of an address on the map by hand-writing the address. Display 100J instantly results (e.g. when unique address portion recognized thereby preventing user specification of entire address (e.g. unique street number(s)) by automatically providing an exploded view. In one example, the user specifically gestured for the exploded view to transition to the summoned position. In another example, the associated data to the map was configured for producing an exploded view in anticipation of what was best for the user when he specified such a search criteria.

Figure 1F:
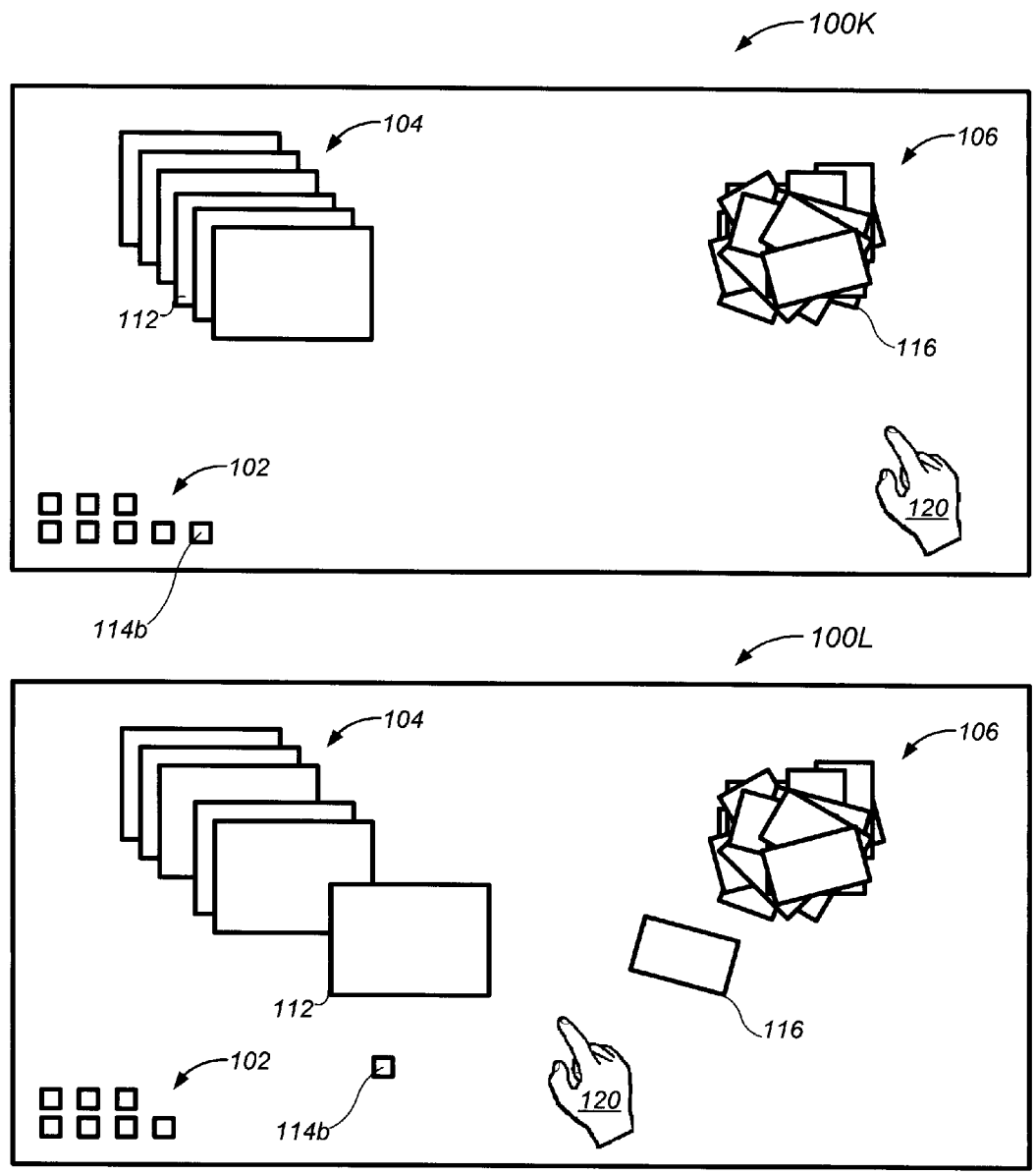

With reference now to FIG. 1F, display 100K depicts the user entering a gesture to display 100K for a magnetic mode. The magnetic mode magnetizes objects with a matching search criteria so that every place a user subsequently touches the display (or interacts with the display such as in a 3D holographic embodiment), all objects matching the search criteria transition toward the current cursor (e.g. touch) position for a configurable percentage of distance in a configured transition manner (e.g. may also scale % (e.g. larger) over distance). This allows the user to be detected at different display positions while "gravitating" objects which match a search criteria toward the active touch position without moving objects fully to a summoned position. When the user is not detected at a position, the object(s) return to their original positions. Preferably, objects transition in a linear progression toward the summoned location. However, a variety of methods for transitioning may be configured. Thus, display 100L depicts the user touching a portion of the display after entering magnetic mode, and objects satisfying the search criteria gravitate toward the user's position detected (e.g. field 450i set to 50%). Removing touch from display 100L results in the objects returning to their original positions.

Figure 2:
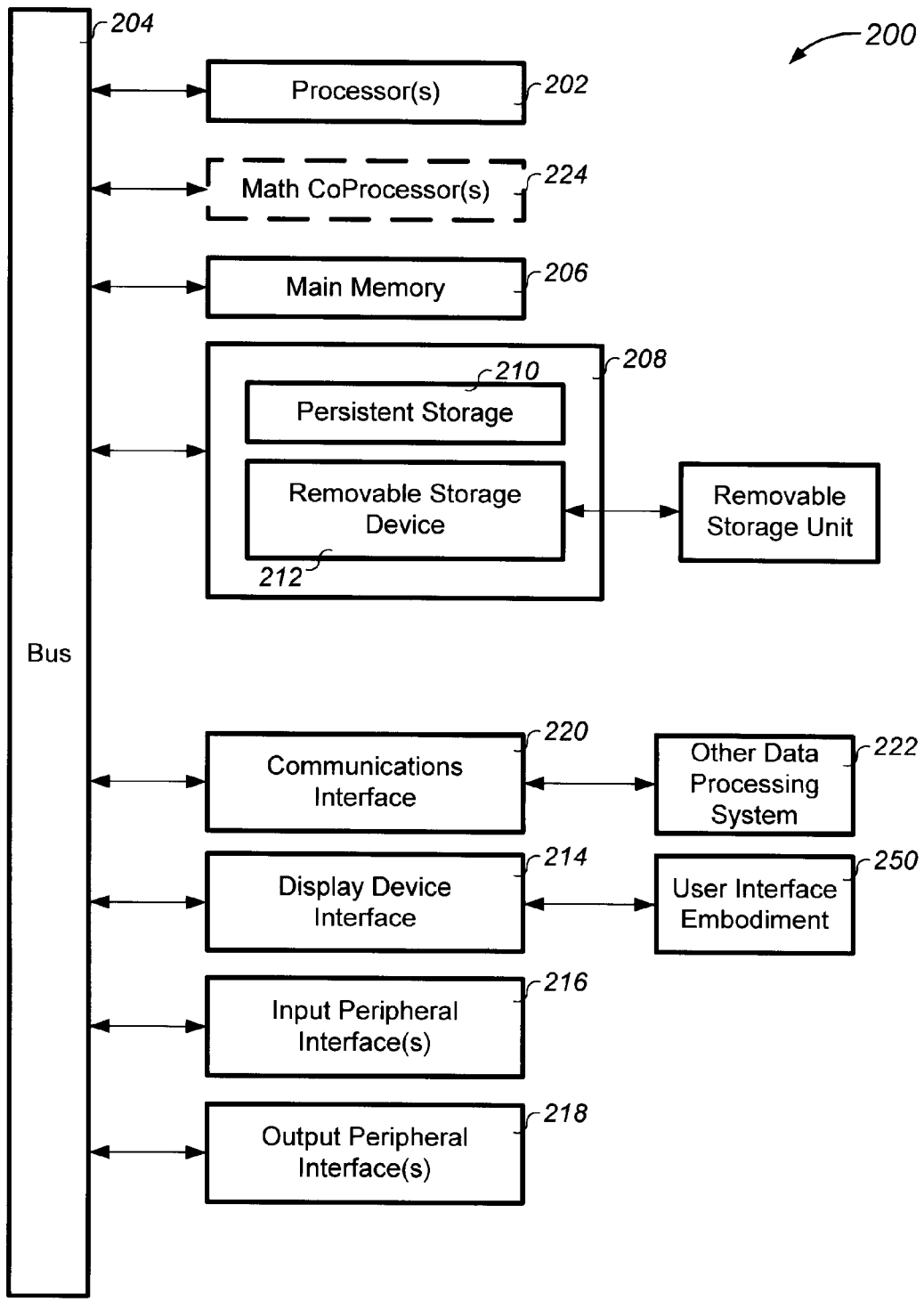
FIG. 2 depicts a block diagram useful for describing a data processing system with a user interface that incorporates disclosed processing and functionality.

FIG. 2 depicts a block diagram useful for describing a data processing system with a user interface that incorporates disclosed processing and functionality. In one embodiment, a user interface driven data processing system for summoning user interface object(s) is data processing system 200. Data processing system 200 preferably includes at least one processor 202 (e.g. Central Processing Unit (CPU)) coupled to a bus 204. Bus 204 may include a switch, or may in fact be a switch 204 to provide dedicated connectivity between components of data processing system 200. Bus (and/or switch) 204 is a preferred embodiment coupling interface between data processing system 200 components. The data processing system 200 also includes main memory 206, for example, random access memory (RAM). Memory 206 may include multiple memory cards, types, interfaces, and/or technologies. The data processing system 200 may include secondary storage devices 208 such as persistent storage 210, and/or removable storage device 212, for example as a compact disk, floppy diskette, USB flash, or the like, also connected to bus (or switch) 204. In some embodiments, persistent storage devices could be remote to the data processing system 200 and coupled through an appropriate communications interface. Persistent storage 210 may include flash memory, disk drive memory, magnetic, charged, or bubble storage, and/or multiple interfaces and/or technologies, perhaps in software interface form of variables, a database, shared memory, etc.

The data processing system 200 includes a display device interface 214 for driving a connected user interface embodiment 250 (e.g. display). In a preferred embodiment, a user interface embodiment display has at least one sensitive display surface for user input and at least one display device control interface for controlling input and/or output to the display device. User interface embodiment 250 may include a plurality of distinct display devices to accomplish a user interface embodiment 250. Display device interface 214 may include a plurality of device interfaces for accomplishing a user interface embodiment 250. Two dimensional and three dimensional display embodiments may be supported. User interface embodiment 250 provides display means to data processing system 200, for example Liquid Crystal Displays (LCDs), Light Emitting Diode (LED) displays, Electroluminescent (EL) displays, customized Color Plasma Displays (CPDs), customized Flat Panel Displays (FPDs), conventional RGB monitors, any of the displays of art discussed above, or the like. User interface embodiment 250 may further provide user input detection means, for example with a touch sensitive surface of the display, or holographic position detection within a 3D image generated. Thus, user input and presentation output may be provided via the display means.

The data processing system 200 may further include one or more distinct input peripheral interface(s) 216 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 216, or by interface 214 described above. Input peripheral interface(s) may provide user input detection means depending on the data processing embodiment or configurations thereof. The data processing system 200 may still further include one or more output peripheral interface(s) 218 to output devices such as a printer, facsimile device, or the like. Output peripherals may also be available via an appropriate interface.

Data processing system 200 can include communications interface(s) 220 for communicating to an other data processing system 222 via analog signal waves, digital signal waves, infrared proximity, copper wire, optical fiber, other wave spectrums, or any reasonable communication medium. There may be multiple communications interfaces 220 (e.g. cellular connectivity, 802.x, etc). Other data processing system 222 may be a service for maintaining universal configurations as discussed with FIG. 4A.

Data processing system programs (also called control logic, or processing code) may be completely inherent in the processor(s) 202 being a customized semiconductor, or may be stored in main memory 206 for execution by processor(s) 202 as the result of a read-only memory (ROM) load (not shown), or may be loaded from a secondary storage device into main memory 206 for execution by processor(s) 202. Such programs, when executed, enable the data processing system 200 to perform features of the present disclosure as discussed herein. Accordingly, such data processing system programs represent controllers of the data processing system.

In some embodiments, the disclosure is directed to a control logic program product comprising at least one processor 202 having control logic (software, firmware, hardware microcode) stored therein. The control logic, when executed by processor(s) 202, causes the processor(s) 202 to provide functions of the disclosure as described herein. In another embodiment, this disclosure is implemented primarily in hardware, for example, using a prefabricated component state machine (or multiple state machines) in a semiconductor element such as a processor 202.

The different embodiments for providing control logic, processor execution, processing code, executable code, semiconductor processing, software, hardware, combinations thereof, or the like, provide processing means for the present disclosure, for example as described by flowcharts.

Those skilled in the art will appreciate various modifications to the data processing system 200 without departing from the spirit and scope of this disclosure. A data processing system preferably has capability for many threads of simultaneous processing which provide control logic and/or processing. These threads can be embodied as time sliced threads of processing on a single hardware processor, multiple processors, multi-core processors, Digital Signal Processors (DSPs), or the like, or combinations thereof. Such multi-threaded processing can concurrently serve large numbers of concurrent tasks. Concurrent processing may be provided with distinct hardware processing and/or as appropriate software driven time-sliced thread processing. Those skilled in the art recognize that having multiple threads of execution may be accomplished in different ways in some embodiments. This disclosure strives to deploy software to readily available hardware configurations, but disclosed software can be deployed as burned-in microcode to new hardware.

Data processing aspects of drawings/flowcharts are preferably multi-threaded so that applicable data processing systems are interfaced with in a timely and optimal manner. Data processing system 200 may also include its own clock mechanism (not shown), if not an interface to an atomic clock or other clock mechanism, to ensure an appropriately accurate measurement of time in order to appropriately carry out time related processing.

Further provided to data processing 200 may be one or more math coprocessor(s) 224 for providing a set of interfaces for very fast mathematical calculations. Those skilled in the art appreciate that optimal mathematical calculation (e.g. floating point) speeds are best accomplished in an interfaced customized hardware component. Graphical coordinate system calculations can benefit from such performance.

Figure 3:
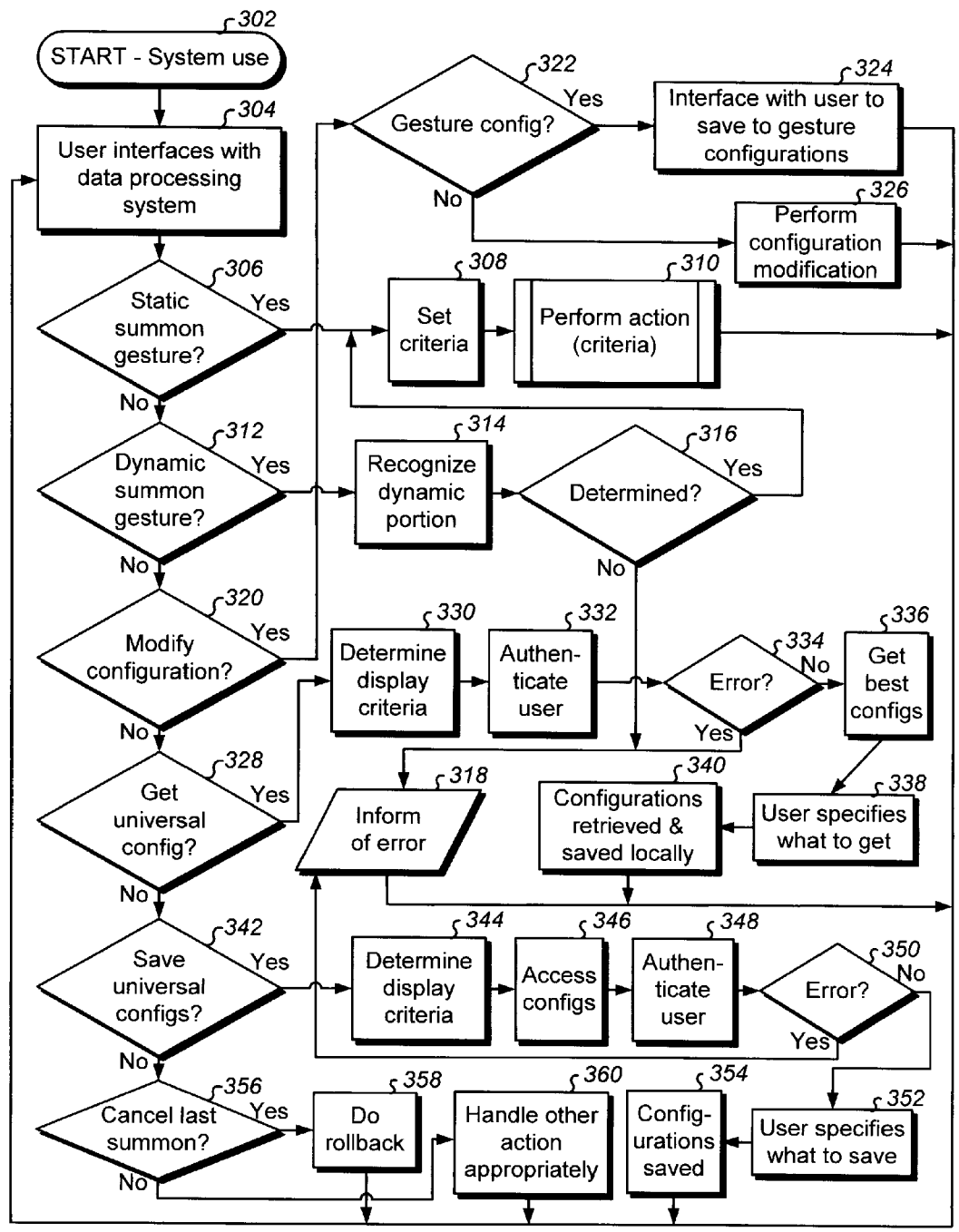
FIG. 3 depicts a flowchart for describing a preferred embodiment of disclosed user interface processing for summoning user interface object(s) and managing configurations for related processing.

FIG. 3 depicts a flowchart for describing a preferred embodiment of disclosed user interface processing for summoning user interface object(s) and managing configurations for related processing. Processing of interest to this disclosure begins at block 302 and continues to block 304 where the user interfaces with the data processing system user interface. User actions (user input events) are monitored and processed at block 304 for navigating the user interface, for example touch screen gestures in a touch screen embodiment. Actions of particular interest to this disclosure cause exit from block 304 and continue to block 306 for describing processing.

Figure 4B:
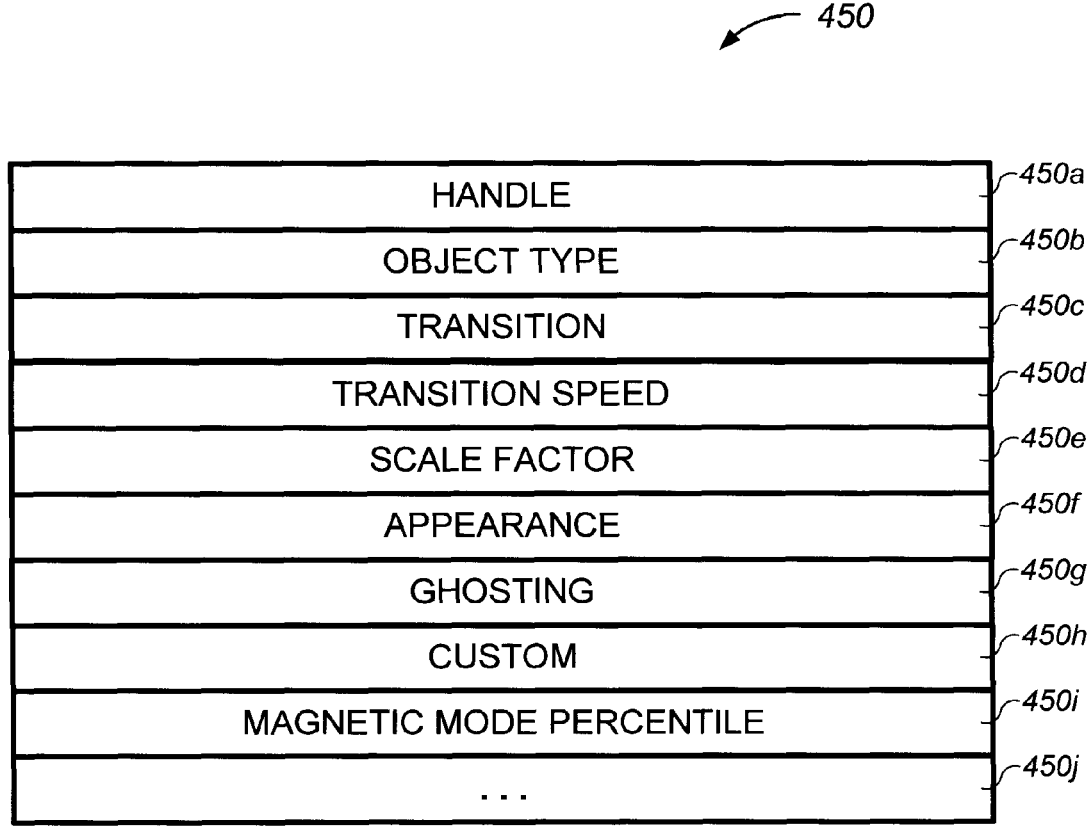
FIG. 4B depicts a preferred embodiment of a Transition Record (TR) 450.
Figure 5:
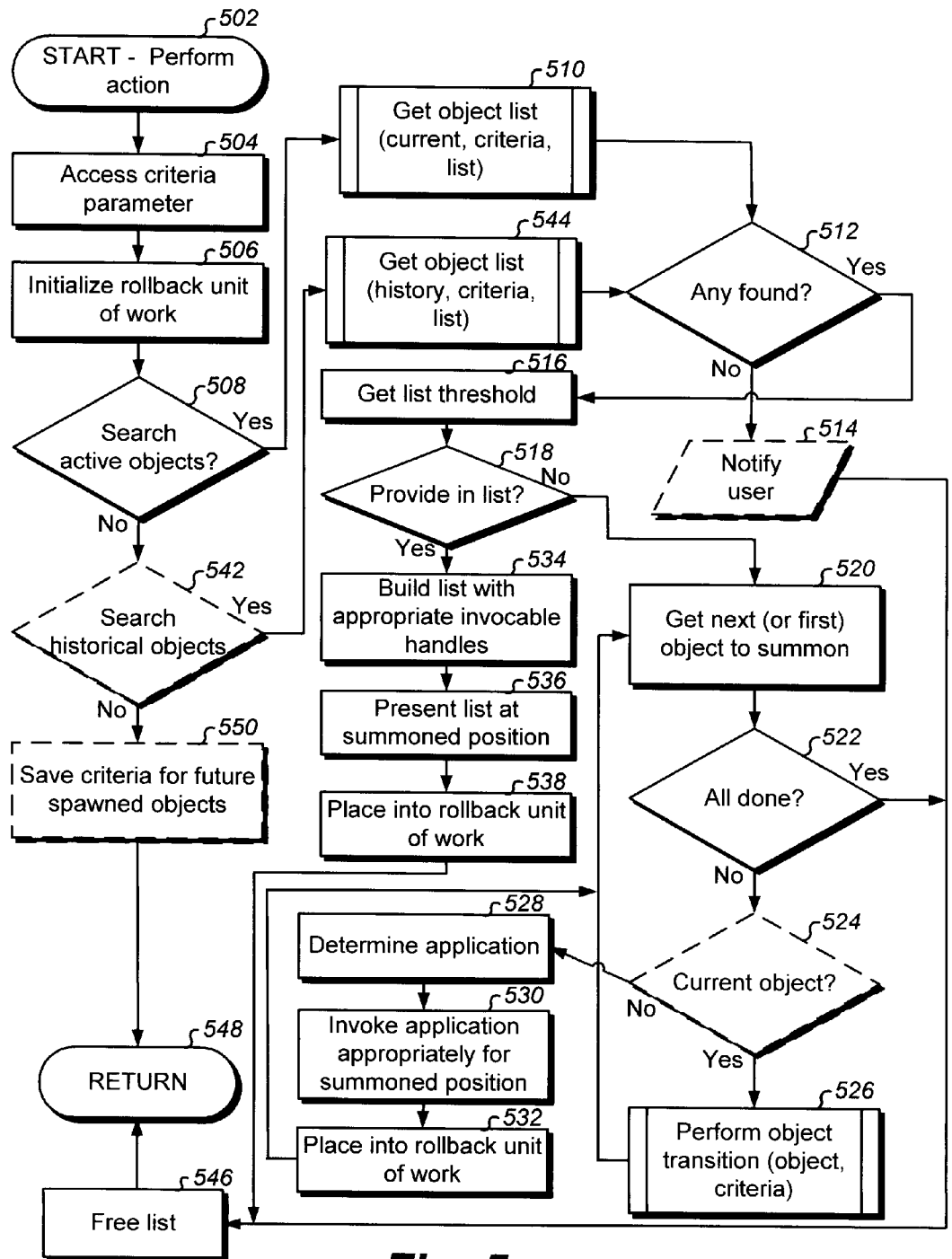
FIG. 5 depicts a flowchart for describing a preferred embodiment of summon action processing.

If block 306 determines the user entered a static summon gesture at block 304, then block 308 sets criteria data to the gesture meaning (or function), block 310 invokes summon action processing of FIG. 5 with criteria as a parameter, and processing continues back to block 304. Block 308 also sets criteria with the summoned position information to know where to summon object(s). In some embodiments, criteria deduced from the gesture may also specify how to transition the object (e.g. data of FIG. 4B). If block 306 determines the user did not enter a static summon gesture, then processing continues to block 312. Static gestures are gestures with an assigned meaning/function, perhaps maintained to a library of gestures for a data processing system so that a different meaning/function can be assigned by an administrator. Static gestures may be assigned with a macro, an operating system command, or some defined set of processing. A static summon gesture is a static gesture with an assigned meaning/function for summoning user interface object(s).

If block 312 determines the user entered a dynamic summon gesture at block 304, then block 314 continues to recognize the remainder of the gesture for determining the meaning/function. For example, block 314 detects the user's handwriting to determine a search criteria for summoning user interface object(s), or detects further gesture manipulations in real time in order to determine the search criteria. When the criteria is recognized, or an error was detected, or a reasonable timeout occurred (e.g. lack of touch recognition) for not recognizing the search criteria, processing continues to block 316. If block 316 determines the entire dynamic summon gesture was recognized, processing continues to block 308 for processing already described for setting user interface object(s) search criteria, otherwise processing continues to block 318 where the user is notified with an error that the gesture was invalid or not recognized. Block 318 provides any reasonable audio and/or visual notification before processing continues back to block 304. Some embodiments may not inform the user of an error (e.g. return directly to block 304 processing), and some embodiments may require the user to acknowledge the error. If block 312 determines the user did not enter a dynamic summon gesture, then processing continues to block 320. A dynamic summon gesture is similar to a static summon gesture except the dynamic summon gesture is treated differently by having the data processing system anticipate additional information entered by the user as part of the gesture for providing further assigned meaning/function. For example, as part of dynamic summon gesture specification determined at block 314, the user may provide search criteria specifications including decipherable gesture handwritten textual, graphical or predefined gesture meaning information. Alternate embodiments may not require recognizing enough of the gesture at block 304 to know it is a dynamic summon gesture before monitoring for additional user specification at block 314 (e.g. dynamic portion of gesture may be provided as a prefix, or as the gesture entirely, rather than as a suffix to recognizing a dynamic gesture is being specified). Full National Language Support (NLS) is to be supported in dynamic summon gesture specifications so that a user can search for user interface object(s) by:

Specifying criteria in any preferred hand written language so that appropriate translations occur to match to user interface objects having associated data in other languages; and Specifying criteria that specifically searches for object(s) with associated data in a certain language.

Figure 4A:
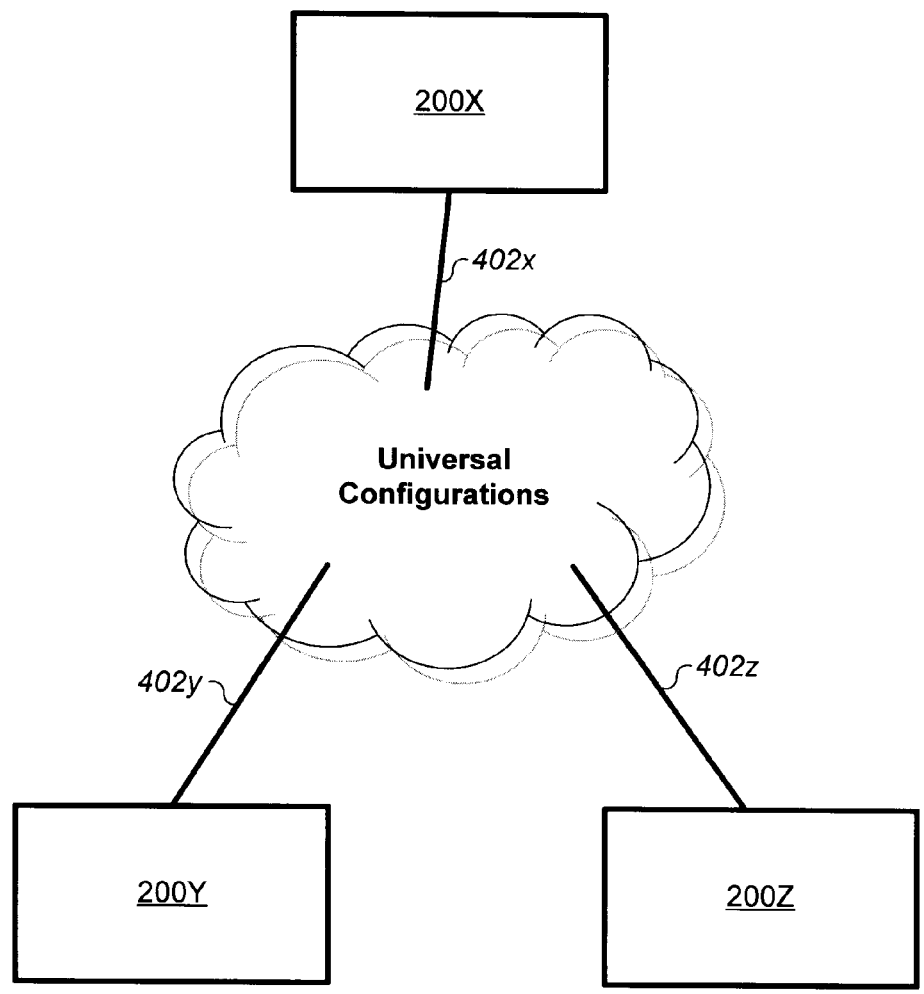
FIG. 4A depicts an illustration for describing a preferred embodiment of universal data processing system configurations which can be maintained by a user for use at any data processing system user interface during his travels.

If block 320 determines the user wanted to modify a data processing system configuration at block 304 (e.g. a user interface control configuration), then processing continues to block 322. If block 322 determines the user wants to configure a gesture (e.g. static summon gesture or dynamic summon gesture), then block 324 interfaces with the user for gesture configuration before processing continues back to block 304. A user may create, alter or delete gestures at block 324. Some embodiments will authenticate the user prior to allowing block 324 processing to ensure the user is an authorized gesture administrator. At block 324, a user may redefine some common dynamic summon gestures to be static summon gestures by defining all criteria including what was previously specified in real time (e.g. at block 314) as part of the static summon gesture meaning/function for ready-use criteria specification at block 308. Very complex dynamic summon gestures can be made static so that all criteria is known at the time of gesture recognition at block 304. For example, the gesture for recognition is stored along with textual search criteria (e.g. a text string) for searching user interface objects (i.e. this prevents the user from having to handwrite the textual search criteria every time to perform the search). If block 322 determines the user wants to modify another type of configuration, then block 326 interfaces with the user for configuration modification before processing continues back to block 304. A user may create, alter or delete other data processing system configurations at block 326. Some embodiments will authenticate the user prior to allowing block 326 processing to ensure the user is an authorized administrator. Configurations (preferably initialized with a reasonable default) which can be made at block 326 include:

Maintaining a list threshold value used at block 516;

Maintaining universal configurations for use at any of a variety of data processing systems as described with FIG. 4A and blocks 328 through 354;

Maintaining TR 450 data of FIG. 4B;

Maintaining (e.g. delete) of future object search criteria used at blocks 550 and blocks 804 through 812;

Maintaining of how to process future object search criteria at block 820 (e.g. criteria for matching to new objects to the user interface is to remain in effect, be disabled or deleted after the first occurrence, be disabled or deleted after a set number of occurrences, or be disabled or deleted after a specified condition (e.g. any data processing system condition which can be configured and determined (e.g. including date/time));

Maintaining user interface configurations (e.g. layout/placement, color scheme (e.g. background/foreground/etc), background image, cursor speed and appearance (e.g. for embodiment other than touch gesture interface), peripheral configurations (e.g. audio settings (e.g. volume), print settings, etc); or Maintaining any other reasonable data processing system configuration.

If block 320 determines the user did not want to modify configuration data, then processing continues to block 328.

If block 328 determines the user wanted to get universal configurations at block 304, then block 330 determines display criteria (e.g. user interface type(s), situational location of display, calendar entry for date/time of user making request at data processing system of display, type of meeting or presentation detected, or any other determined condition for the user being at the data processing system of FIG. 3), block 332 authenticates the user to a remote service, and processing continues to block 334. Different block 332 embodiments may use previously provided user credentials, assume some credentials, or require the user to perform a login. If block 334 determines the service could not be successfully accessed, processing continues to block 318 for providing an error to the user in a similar manner as described above, otherwise block 334 continues to block 336 where the remote service is accessed for configurations applicable to the current data processing system of FIG. 3 as determined by block 330 display criteria, block 338 where the user may qualify suggestions with specific configurations to retrieve, block 340 for retrieving the configurations to the FIG. 3 data processing system and saving locally for subsequent in-effect use, and then back to block 304. If block 328 determines the user did not want to get universal configurations, then processing continues to block 342.

If block 342 determines the user wanted to save universal configurations at block 304, then block 344 determines display criteria (e.g. user interface type(s), situational location of display, calendar entry for date/time of user making request at data processing system of display, type of meeting or presentation detected, or any other determined condition for the user being at the data processing system of FIG. 3), block 346 accesses configurations of the FIG. 3 data processing system that may be saved, block 348 authenticates the user to a remote service, and processing continues to block 350. Different block 348 embodiments may use previously provided user credentials, assume some credentials, or require the user to perform a login. If block 350 determines the service could not be successfully accessed, processing continues to block 318 for providing an error to the user in a similar manner as described above, otherwise block 350 continues to block 352 where the user may qualify specific configurations to be saved and the display criteria to be saved with those configurations (for best qualifying future downloads), block 354 for saving the configurations of the FIG. 3 data processing system to the remote service authenticated at block 348, and then back to block 304. If block 342 determines the user did not want to save universal configurations, then processing continues to block 356.

If block 356 determines the user requested to cancel (i.e. undo) the last user interface object(s) summon request, then block 358 performs rollback processing which results in returning any objects to their original position(s) which were last summoned. Preferably, the cancellation request is performed with a static gesture in a touch user interface embodiment. Block 358 effectively does an "undo" of the last performed summoning action. Blocks 506, 532, 538 and 712 enable the ability to perform the rollback. Different rollback embodiments may use transition information in reverse (e.g. transition backwards), or instantly return the object(s) to their original position(s). Block 358 may destroy a list produced at block 536, terminate application(s) started at block 530, or return object(s) to their original position(s) which were transitioned by FIG. 7. Block 358 appropriately handles errors, for example those caused by user interface navigation subsequent to the last summoning action. An expiration time or event may be implemented for the ability to perform a rollback. Block 358 continues back to block 304.

FIG. 4A depicts an illustration for describing a preferred embodiment of universal data processing system configurations which can be maintained by a user for use at any data processing system user interface during his travels. Universal configurations are stored at the remote service described with FIG. 3. Preferably, the remote service is a true cloud computing platform, for example as would be implemented with Microsoft Azure platform offerings. Universal configurations are stored in a generic format which can be translated to specific uses. For example, configuration data (e.g. gestures, data configured at block 326, or any other configuration data) is preferably stored in SQL database form, but preferably converted to XML form when retrieving at block 340. Block 340 may convert the configurations to another format for use at the FIG. 3 data processing system. Similarly, configuration data is preferably sent to the remote service in XML form at block 354. Block 346 may convert the configurations from another format used at the FIG. 3 data processing system. Using XML means for interchange between the cloud based remote service and the FIG. 3 data processing system adheres to best practices for Service Oriented Architecture (SOA). Display criteria associated with the configuration data is also preferably carried in XML form, and is used to identify the best or correct configurations for a particular FIG. 3 data processing system, and perhaps how to convert, modify or set the data dependent on a particular data processing system.

A user at the FIG. 3 data processing system can save or retrieve configurations (e.g. gestures or any other configuration) so as to prevent having to recreate or modify configurations at every data processing system he wants to interface with. Configurations can be maintained at a single data processing system, and then made available to other data processing systems. For example, the user at data processing system 200x saves his configurations to the cloud (i.e. remote service) in the United States over a communications connection 402x, and later accesses those configurations at data processing system 200Y in Germany over a connection 402y. The user may make changes to configurations at data processing system 200Y which can be saved to the cloud for accessing at different data processing system 200Z over connection 402z. Display criteria determined at blocks 330 and 344 help make certain configurations dependent on conditions of particular data processing systems. Data processing systems 200x, 200Y and 200Z may have identical user interfaces, or may have different user interfaces. Universal configurations are stored in a universal format and converted appropriately using display criteria determined at blocks 330 and 344. Universal configurations enable a user to make a configuration one time for use at a plurality of different data processing systems, and for maintaining a single usable copy. Connections 402x, 402y, and 402z can be of any of those described with communications interface(s) 220. Any of the configuration data maintained at blocks 324 and 326 can be maintained to universal configurations for access at various data processing systems.

FIG. 4B depicts a preferred embodiment of a Transition Record (TR) 450. A TR 450 contains information for how to perform object transitions in the user interface when performing summoning requests. While Transition Records (TRs) 450 exemplify data maintained for a two dimensional user interface such as a touch-sensitive display, other embodiments will exist depending on the particular user interface type. A TR handle field 450a contains a unique key field identifier to the TR table record and is used to uniquely identify a particular TR to a data processing system. An object type field 450b indicates the type (e.g. object class) of objects for which the TR is defined for. Type field 450b can use any values that will uniquely associate the TR to a specific user interface object, or group of user interface objects. A transition field 450c defines a type of transition to be used on a summoned object. Types of object transitions include NONE (i.e. instantly disappear from original position and reappear at summoned position (preferably occurs by default when no transition configuration found)), move linearly from the original position to summoned position at a specified display number of trails, move at a certain mathematical function path (e.g. arc) from the original position to summoned position at a specified number of trails, or any reasonable method for transitioning the object. If an explicit NONE specification is used, fields 450d through 450h would be ignored. Transition speed field 450d contains data affecting how slow or fast the transition should occur. Scale factor 450e contains data (e.g. 100%=as is, 50%=half the size, 200%=double the size, etc) for whether to zoom in or zoom out the object as it transitions, preferably with the field 450e being the last size at the summoned position such that the object grows or shrinks appropriately as it transitions from the original position to summoned position. Appearance field 450f may be used to specify what types of appearance characteristics should change when performing the object transition (e.g. background, foreground, colors, fonts, etc). Ghosting field 450g contains data for whether or not to ghost the transitioned object. Ghosting refers to a watermark or transparent appearance so as to be less conflicting with objects which are intersected during the transition. A highest ghosting value (e.g. 100) indicates to overlay objects opaquely in the path of transition while transitioning, a lowest ghosting value (e.g. −100) indicates to be in a least priority position during the transition (i.e. intersecting objects opaquely overlay the transitioned object) and a value between the lowest and highest values indicate how transparent to make the object image during the transition (e.g. 0 indicates no ghosting, 50 indicates a watermark appearance in overlay priority during transition, and −50 indicates a watermark appearance in being overlaid priority during transition). Ghosting (watermark) intensities are set with different values. Custom field 450h can contain any custom transition processing to perform. Field 450h may or may not be used with other fields to perform the transition. Magnetic mode percentile field 450i is a special distance percentage value explained in detail below with magnetic mode processing. Other fields 450j may further clarify object behavior for transition processing when automatically moving the object from an original position to the summoned position. For example, an object destination field of fields 450j can be used to specify a summoned position override display position when summoning (e.g. object centered at summoned position, object left hand top corner at summoned position, any position relative summoned position, etc). The object destination field can also provide explicit display coordinates to use for overriding the usual summoned position (e.g. summon to display location other than the last detected position of user input in the user interface).

Field 450b can be used to associate to a specific data object, or user interface object, which is associated (e.g. child or parent object) with a user interface object (e.g. examples of FIGS. 1D, 1E and video 110). Custom field 450h may also be used to perform exploded views, panning, viewing re-orientations, axis rotations, different perspectives or view angles, or any conceivable custom transition.

Some TR 450 fields are multi-part fields (i.e. have sub-fields). TRs 450 may be fixed length records, varying length records, or a combination with field(s) in one form or the other. Some TR embodiments will use anticipated fixed length record positions for subfields that can contain useful data, or a null value (e.g. −1). Other TR embodiments may use varying length fields depending on the number of sub-fields to be populated. Other TR embodiments will use varying length fields and/or sub-fields which have tags indicating their presence. Other TR embodiments will define additional fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments).

FIG. 5 depicts a flowchart for describing a preferred embodiment of summon action processing. Summon action processing begins at block 502 and continues to block 504 where the criteria parameter is accessed, block 506 where a new rollback unit of work is initialized, and then to block 508. Block 504 accesses object search criteria as well as the summoned position (where to transition object(s) to) for the request. If block 508 determines the user requested to search currently active user interface objects in the display, then block 510 invokes get object list processing of FIG. 6 with "current" (i.e. search currently active objects), search criteria accessed at block 504, and means (e.g. memory 206 address) to return a list as parameters. On the return from FIG. 6, processing continues to block 512. If block 512 determines no object was found for being summoned, block 514 notifies the user and processing continues to block 546 for freeing any list memory allocated by FIG. 6, and then to block 548 for returning to the invoker (e.g. FIG. 3). Block 514 provides any reasonable audio and/or visual notification before processing continues to block 546. Some embodiments may not inform the user of no objects found matching criteria for being summoned (e.g. return directly to block 546). If block 512 determines one or more objects were matched to the summon criteria, then block 516 accesses a threshold configuration (e.g. configured at block 326) for whether or not to produce a list of a plurality of objects, rather than move the plurality of objects to be summoned. For example, a threshold of 5 indicates to transition up to 4 objects from their original positions to the summoned position, otherwise 5 or more objects are to be presented to the user at the summoned position in a list form for subsequent user interaction (e.g. display 100F). Threshold configurations may take on a variety of embodiments, such as those including always do a list, never do a list, a number of objects to trigger a list, certain types of objects to trigger a list, configured data processing system conditions which may trigger a list such as any of those determinable by a FIG. 2 embodiment, etc. Thereafter, if block 518 determines a list is not appropriate, block 520 accesses the first object in the list returned from FIG. 6 processing. The list is preferably a list of records with at least a handle to the user interface object, and an object type (e.g. to compare to field 450b). Depending on an embodiment, additional information may include whether or not the handle is currently active on the display or how to find it in history. Thereafter, if block 522 determines all objects have been processed from the list from FIG. 6 (which they are not upon first encounter to block 520 from block 518), processing continues to block 546. Block 546 will not have to free an empty list, but will free a list of one or more records. If block 522 determines an object remains for processing, block 524 checks if the object is a currently active object in the user interface (e.g. "current" or "history"). If block 524 determines the object is currently active, block 526 invokes transition processing of FIG. 7 with the list entry and specifically the summoned position of criteria accessed at block 504 before continuing back to block 520. Block 520 gets the next object from the list returned from FIG. 6 processing thereby starting an iterative loop for handling each list record with blocks 520 through 532.

Referring back to block 524, if the object in the list is indicated as not being a currently active object in the display, block 528 determines the application for the object, block 530 invokes the application for being presented at the summoned position, block 532 places the application started into the rollback unit of work started at block 506, and processing returns to block 520 for a next record in the list. Referring back to block 522, if all records in the list have been processed, block 546 frees the list, and the invoker of FIG. 5 processing is returned to at block 548. Referring back to block 518, if a list is to be presented to the user, block 534 builds a list (may be scrollable) with invocable handles (e.g. user interface object handle, or fully qualified executable path name (or invocable handle thereof)), block 536 presents the user interface list at the summoned position, block 538 places the list into the rollback unit of work started at block 506, and processing continues to block 546 already described. Block 536 may provide easy-selectable informative descriptions for entries in the presented list which are each mapped to the invocable handles. Block 534 provides similar processing to iterative processing started at block 520 except a presented list is built for the user. Once the list is produced at block 536, the user can interact with it for selecting any of the entries to invoke the handle (i.e. invoke application implies starting it (causes same processing as blocks 530 through 532); invoke user interface object handle implies summoning it (causes same processing as block 526)). Referring back to block 508, if the summon request was not for currently active user interface objects, processing continues to block 542.

Figure 6:
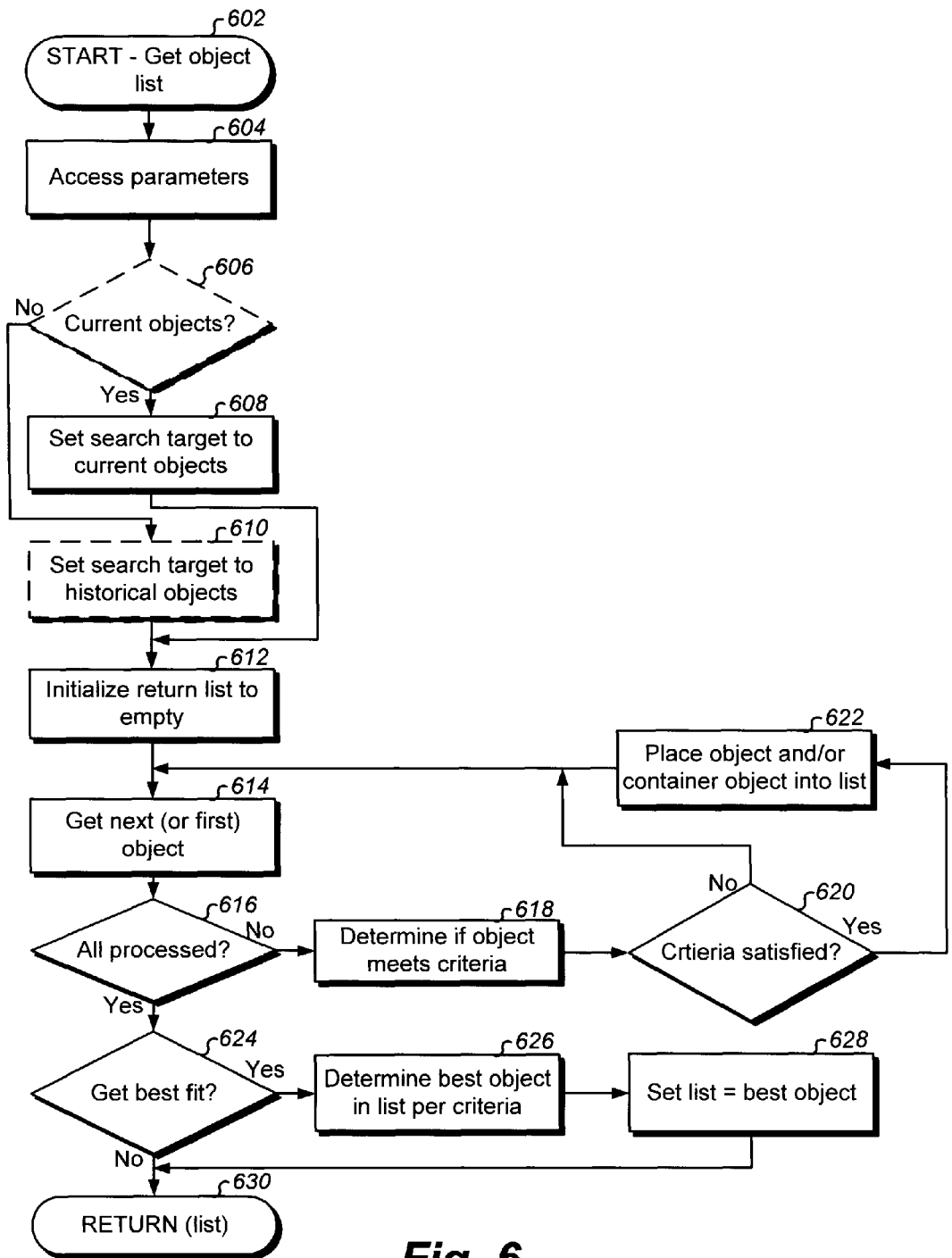
FIG. 6 depicts a flowchart for describing a preferred embodiment of processing for searching user interface objects for search criteria and producing a list of matches.

If block 542 determines the user requested to search historically presented user interface objects, then block 544 invokes get object list processing of FIG. 6 with "history" (i.e. search historically presented objects), search criteria accessed at block 504, and means (e.g. memory 206 address) to return a list as parameters. On the return from FIG. 6, processing continues to block 512 for subsequent processing described above. If block 542 determines the user did not request to search historically presented user interface objects, then block 550 saves criteria accessed at block 504 for comparing to newly created objects in the user interface of the data processing system, and the invoker of FIG. 5 processing is returned to at block 548.

Figure 7:
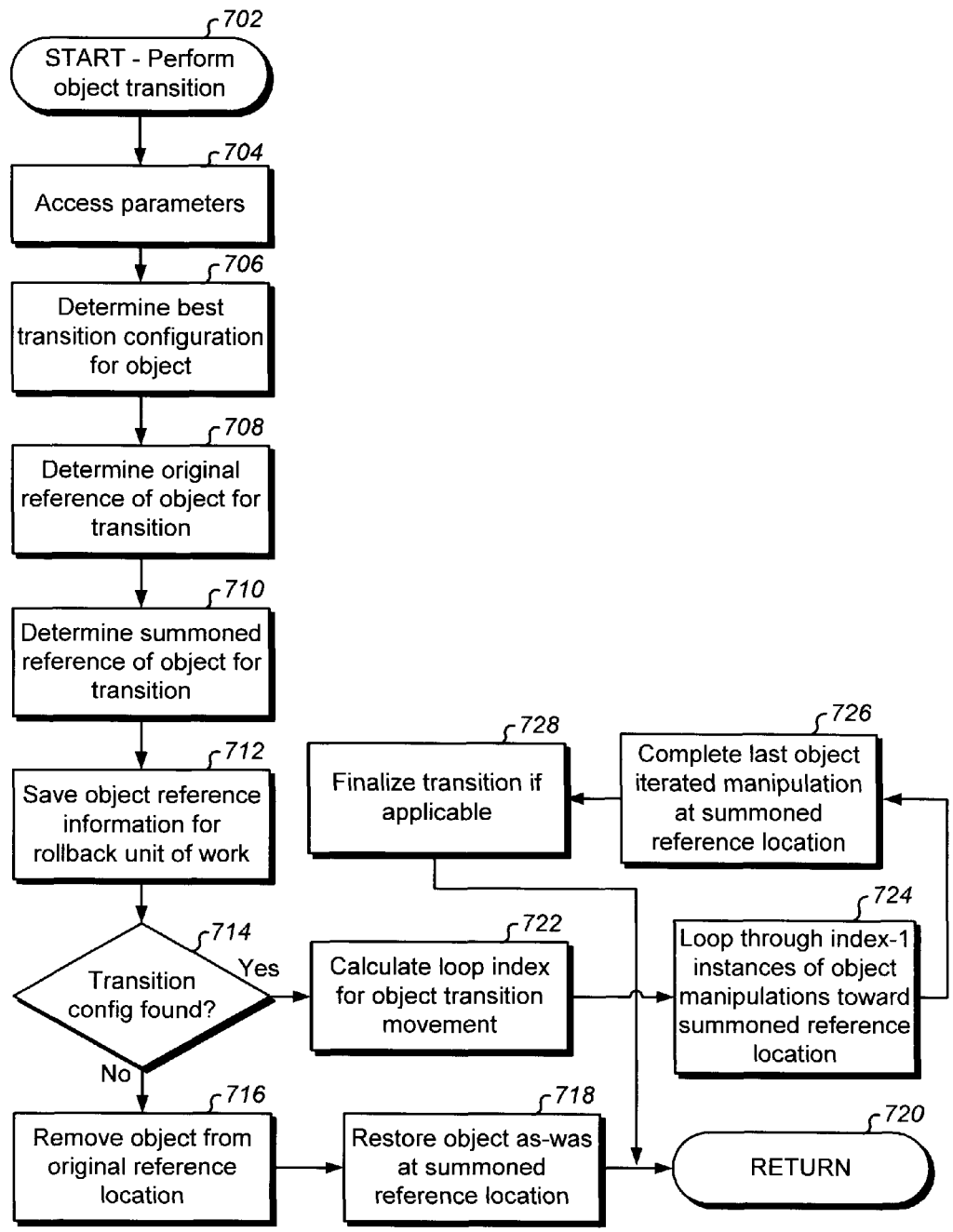
FIG. 7 depicts a flowchart for describing a preferred embodiment of object transition processing.

FIG. 7 processing invoked at block 526 determines the context for proper transition processing based on the object type being transitioned and the context of the summon request. For example, transitioning any of a plurality of desktop objects to the user's summoned position is contextually different than using field 450h to transition (e.g. exploded view) within the context of a graphic being manipulated.

In some embodiments, historically presented user interface objects are searched automatically after failure to find a currently active user interface object which satisfies the search criteria. FIG. 6 processing invoked at block 544 should be reasonable in what history is searched at the data processing system. Maintaining history for every user interface object and every change thereof while associating it to the application can be costly in terms of storage and performance. A trailing time period of history which is automatically pruned may be prudent, or the types of object information saved for being searched may be limited. In some embodiments, currently active user interface objects can be matched to search criteria by searching historical information which was present at some time in history to the user interface object.

In some embodiments, block 530 will incorporate processing to position the sought object of the application to the summoned position. Such embodiments may rely on application contextual processing (e.g. methods analogous to U.S. Pat. No. 5,692,143 ("Method and system for recalling desktop states in a data processing system", Johnson et al)) for producing a user interface object which depends on invoking an application and subsequently navigating it in order to produce the sought object at the summoned position.

FIG. 6 depicts a flowchart for describing a preferred embodiment of processing for searching user interface objects for search criteria and producing a list of matches. Get object list processing begins at block 602, and continues to block 604 for accessing parameters passed by the invoker (e.g. search type (current/history), search criteria), and then to block 606. If block 606 determines currently active user interface objects are to be searched, block 608 sets the search target to the current data processing system user interface object hierarchy root node (of GUI object tree), otherwise block 610 sets the search target to historical data maintained for user interface objects over time (historical data can take a variety of embodiments while knowing that object handles in such history are only valid while the object is currently active in the data processing system). Blocks 608 and block 610 continue to block 612 for initializing a return object list to NULL (no records), and then to block 614 for accessing the first user interface object information of the search target (e.g. object in GUI object tree). Blocks 608 and 610 access contextually appropriate information, for example in context of a desktop, a manipulated map graphic, or specific node scope in a Graphical User Interface (GUI) object tree.

A data processing system provides Application Programming Interfaces (APIs) for developing GUI applications. While varieties of data processing systems (e.g. Windows, Linux, OS/X, Android, iOS, etc) may provide different models by which a GUI is built (e.g. programmed by a programmer), appropriate interfaces (e.g. APIs) are used for building a user interface to accomplish similar functionality (e.g. icons, windows, etc and elements (entry fields, radio buttons, list boxes, etc) thereof). The present disclosure is applicable to any variety of data processing systems, however a reasonably common GUI model shall be described to facilitate discussing operation of the present disclosure from a programming/processing standpoint.

A window is defined herein as an area of the display controlled by an application. Windows are usually rectangular but other shapes may appear in other GUI environments (e.g. container object of user interface in a three dimensional GUI embodiment). Windows can contain other windows and for purposes herein, every GUI control is treated as a window. A GUI control controls the associated application. Controls have properties and usually generate events. Controls correspond to application level objects and the events are coupled to methods of the corresponding GUI object such that when an event occurs, the object executes a method for processing. A GUI environment provides a mechanism for binding events to methods for processing the events. Controls may be visible (e.g. button) or non-visible (e.g. timer). A visible control which can be manipulated by the user of a GUI can be referred to as a widget. A widget includes frame, button, radio button, check button, list box, menu button (i.e. to build menus), text entry field, message box, label, canvas (i.e. area for drawing), image (i.e. area for graphic display), scale/scroll bar, and other visible controls well known to those skilled in the art. A frame is used to group other widgets together and it may contain other frames. A frame may represent an entire window. For purposes of this disclosure, a searchable data object may also be associated with a window, frame or control.

Other GUI terminologies include: layout which is a format specification for how to layout controls within a frame (e.g. through a coordinate system, relative positioning, pixel specifications, etc); parent which represents a position in a GUI hierarchy which contains one or more children; and child which represents a position in a GUI hierarchy which is subordinate to a parent. GUI applications consist of a GUI object hierarchy. For example, a frame for an application window may contain frames which in turn contain frames or controls, thereby forming a tree hierarchy. The hierarchy structure provides means for the programmer to apply changes, preferences or actions to a parent and all of its children. For example, a desktop can be the topmost window or frame of the hierarchy tree. A GUI has at least one root window and windows have an organizational hierarchy wherein windows form a tree such that every window may have child windows. This makes windows searchable by starting at a root window and searching siblings in turn down the tree. Regardless of terminology, there is a method for searching GUI objects starting from the root (e.g. desktop, or main window of context) of the tree down to the leaves of the tree.

A key concept in GUI programming is the containment hierarchy. Widgets are contained in a tree structure with a top level widget controlling the interfaces of various child widgets which in turn may have their own children. Events (e.g. user input actions) arrive at an applicable child widget. If the widget does not deal with the event, the event will be passed to the parent GUI object up the containment hierarchy until the event is completely processed. Similarly, if a command is given to modify a widget, the command can be passed down the containment hierarchy to its children for organized modification. The GUI object containment tree facilitates events percolating up the tree and commands being pushed down the tree. The GUI object containment tree facilitates searching all objects.

Graphical user interfaces manage windows. A window belongs to a window class (making it possible to search them by class). In fact, every GUI object (control, frame, etc) can be of some class. Some windows have text attached to them (e.g. titlebar text) to facilitate identifying the window, and this may be viewed as a data object associated to the window object. Every window has a unique handle (e.g. numeric ID) for programmatic manipulation, but windows may also be identified by their text, class, and attributes. A GUI may have multiple containment hierarchies or a somewhat different method for a containment hierarchy. For purposes of this disclosure, all GUI objects are contained in what shall be referred to as the GUI object tree wherein every object is a node on that tree. Various tree traversal and search enhancement techniques may be utilized to maximize performance when searching the tree.

With reference back to FIG. 6, block 614 continues to block 616. Block 616 checks if all target information has been searched. If target information was found for processing, block 618 determines if the target information (e.g. currently active user interface object, or historical object information) contains data which matches the search criteria accessed at block 604. Block 618 may perform a language translation to match search criteria against information in a different language, a graphical comparison, a textual comparison, or any other comparison method. Thereafter, if block 620 determines a match was found, block 622 inserts a record into the return list with at least the object handle which can be summoned (e.g. may be a parent object to the matched currently active object, or invocable application handle to produce the object which at one time contained the search criteria, or the handle of an object with a special relationship to the searched object) and object type (e.g. compare to field 450*b* for transition processing), and processing continues back to block 614. If block 620 determines no match was found, then processing continues directly back to block 614. Block 614 gets the next target information to be searched thereby starting an iterative loop for handling all target information with blocks 614 through 624. If block 616 determines all target information has been checked, processing continues to block 624. If block 624 determines the search criteria indicates to select the best fit rather than a plurality of objects, then block 626 determines the best fit object, block 628 appropriately sets the list to that single object (or application invocation handle), and processing returns to the invoker (e.g. FIG. 5) at block 630 with the list created. If block 624 determines a single best fit is not being sought, then block 624 continues to block 630 for returning the list built to the invoker. Searching currently active user interface objects and using appropriate handles in the list is straightforward, while embodiments supporting searching historical information may significantly deteriorate data processing system performance during search time, and in keeping large amounts of information for objects without valid handles. In an alternate embodiment, handles are maintained uniquely at the data processing system over a reasonable time period to ensure uniqueness across all currently active and historically presented user interface objects.

In some embodiments, block 618 may automatically check historical information for a currently active user interface object in order to satisfy a search criteria (e.g. which has not been satisfied by a currently active user interface object). In some embodiments, sophisticated search processing systems and methods may be used instead of the simple processing of FIG. 6 for searching target information.

Examples of searches which are accomplished with static or dynamic gestures include summoning object(s) by:
Contained content (e.g. text, color, graphical characteristic(s), language, charter set, etc);
Appearance;
Window titlebar text;
URL displayed;
Object type or class;
Object variety (e.g. button, control type, widget type, etc);
Data processing system conditions associated to an object (e.g. CPU activity, memory utilization or conditions (e.g. swapped), permissions, attributes, associated code segment contents, associated data segment contents, associated stack segment contents, or any other conditions which can be determined for a user interface object);

Associated content;

Active audio content being output by object;

Active language being output by object;

Amount (maximum, least or specified) of movement by contents of object (e.g. pixel changes, frame rate refreshes, geometric vector characteristics, etc);

Particular owner or user;

Special application relationship of object such as family object with relationship to searched object (e.g. Father, Son, etc), service object with relationship to searched object (e.g. Police Department, Fire Department, etc), or any other determinable relationship of one or more objects to the searched object;

Particular user's (i.e. current user or a specified user) most recently used object (may specify Nth order);

Particular user's least, or oldest, used object (may specify Nth order);

Particular user's newest object spawned to user interface (may specify Nth order);

Particular user's tallest object;

Particular user's shortest object;

Particular user's widest object;

Particular user's thinnest object;

Particular user's most CPU intensive object;

Particular user's object using most allocated storage;

Particular user's most volume consuming object (e.g. volume as displayed in a two dimensional user interface embodiment, or as occupied in holographic user interface embodiment); or Any other reasonable criteria for usefully summoning user interface objects to a user, for example in a large display user interface.

FIG. 7 depicts a flowchart for describing a preferred embodiment of object transition processing. Objects are transitioned to provide visual and/or audio animation of moving an object to the summoned position. Audio animation specifications may be stored in fields 450*j*. Transition processing begins at block 702 and continues to block 704 where parameters (object reference (i.e. the list record for the object) and summoned position) are accessed, block 706 where TRs 450 are accessed for determining a best transition (if any) for the object (e.g. compare object type to field 450*b*), block 708 for determining the original reference (includes original position) of the object for graphical transition, block 710 for the summoned reference (includes summoned position) for the object for graphical transition, block 712 for saving reference information to the currently active rollback unit of work, and then to block 714. Blocks 708 and 710 determine appropriate context reference information such as relative the desktop, relative a map graphic, relative a window, relative a particular object in the GUI object tree (e.g. use of field 450*h*), etc.

If block 714 determines a transition configuration was found at block 706, then block 722 calculates a loop index for object transition movement that may be applicable for the identified TR 450, block 724 iterates through all but one instance of graphically transitioning the object toward the summoned position, block 726 completes the last graphical change for the final summoned position of the object, block 728 finalizes any applicable transition processing further indicated by the transition configuration for the object, and processing returns to the invoker (e.g. FIG. 5) at block 720. There are various embodiments for accomplishing blocks 722, 724, 726 and 728. For example, the data processing system can automatically be fed iterative user input (drag requests) to cause moving the object being transitioned. Specific data processing system interfaces may also be provided for automatically transitioning an object based on a configured type of transition. If block 714 determines no suitable TR 450 configuration was found, block 716 processes a reasonable default such as instantly removing the object from the user interface at block 716 and making it reappear as it was at the summoned position at block 718 before continuing back to the invoker at block 720.

Figure 8A:
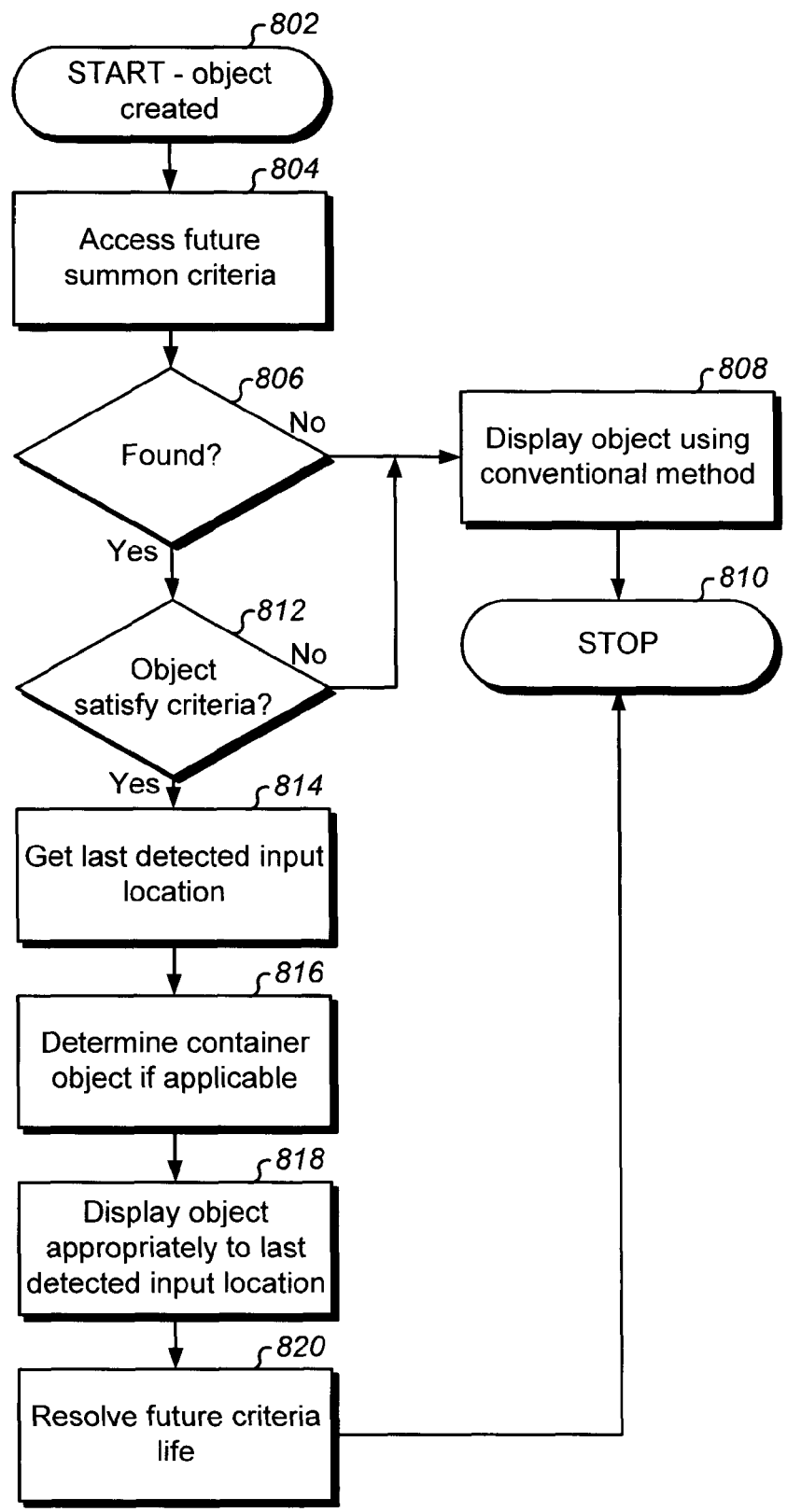
FIG. 8A depicts a flowchart for describing a preferred embodiment of summon specific processing when creating (e.g. newly displaying) a user interface object in a data processing system.

FIG. 8A depicts a flowchart for describing a preferred embodiment of summon specific processing when creating (e.g. newly displaying) a user interface object in a data processing system. Block 802 processing preferably begins as a last step in creating a user interface object to the user interface. Block 802 continues to block 804 where future criteria saved at block 550 is accessed, and then to block 806. If block 806 determines future criteria was not found, block 808 presents the user interface object in the conventional manner before processing terminates at block 810. If block 806 determines criteria from block 550 was found, processing continues to block 812. If block 812 determines the newly created object does not satisfy the search criteria, processing continues to block 808 already described. If block 812 determines the newly created object matches the search criteria, block 814 determines the user's last detected input position for designating as the summoned position, block 816 determines the appropriate object which should be summoned after the object is created (e.g. parent object to be summoned which contains matched object), block 818 displays the object appropriately to the determined summoned position (e.g. last detected user input location to user interface), block 820 resolves the life of the search criteria set by block 550, and processing terminates at block 810. Depending on the type of object being created, and the context of the object being created (e.g. in context of map manipulation, specific window interface, or overall desktop, etc), block 818 may have to create the object first and then display it as part of a parent object. In some embodiments, TRs 450 are checked to transition the object from a conventionally placed location in the user interface to the determined summoned position, or for determining how the object is presented. Block 820 may delete future object search criteria (i.e. disable criteria after first occurrence), increment a counter for determining when to delete future search criteria at block 820 (i.e. disable criteria after number of occurrences), check data processing system condition(s) for whether or not to delete the future search criteria, or leave the future search criteria intact (i.e. remain in effect). Block 326 is used to configure specific processing at block 820.

Figure 8B:
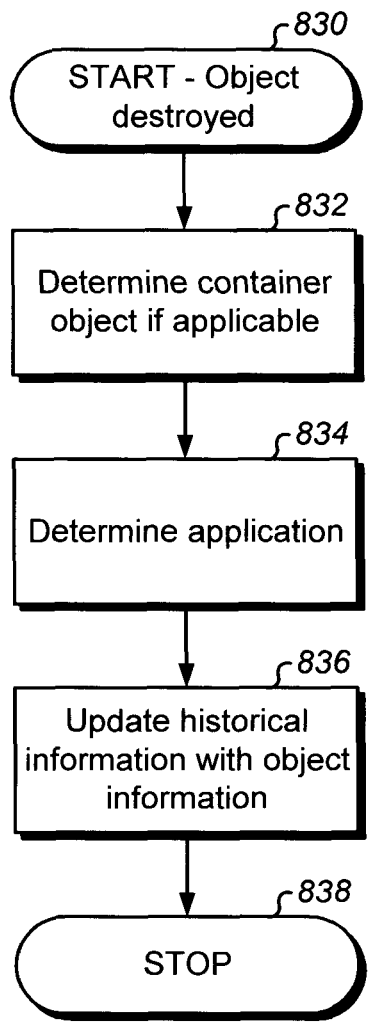
FIG. 8B depicts a flowchart for describing a preferred embodiment of summon specific processing when destroying (e.g. terminating) a user interface object in a data processing system.

FIG. 8B depicts a flowchart for describing a preferred embodiment of summon specific processing when destroying (e.g. terminating) a user interface object in a data processing system. Block 830 processing preferably begins as the last step in destroying (e.g. terminating from user interface) a user interface object of the user interface. Block 830 continues to block 832 for determining the appropriate object which can be summoned for the object (e.g. parent object), block 834 where the associated application is determined, block 836 where historical information is updated in a manner facilitating search of the history information and related processing as discussed above, and then to block 838 where processing terminates.

Figure 8C:
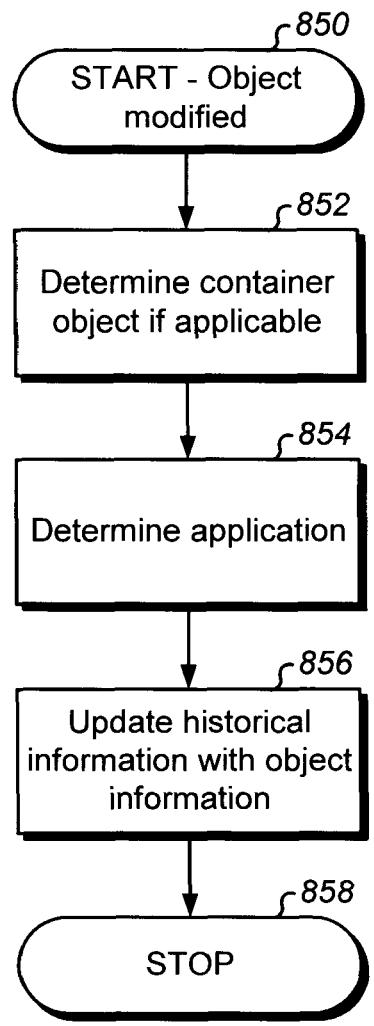
FIG. 8C depicts a flowchart for describing a preferred embodiment of summon specific processing when modifying any aspect of a current (i.e. active) user interface object in a data processing system.

FIG. 8C depicts a flowchart for describing a preferred embodiment of summon specific processing when modifying any aspect of a current (i.e. active) user interface object in a data processing system. Block 850 processing preferably begins as the last step in a user interface object being modified (e.g. content modified) for any reason for supported search criteria of the present disclosure. Block 850 continues to block 852 for determining the appropriate object which can be summoned for the object (e.g. parent object), block 854 where the associated application is determined, block 856 where historical information is updated in a manner facilitating search of the history information and related processing as discussed above along with content changed, and then to block 858 where processing terminates. FIG. 8C should be used judiciously relative supported search criteria so that excessive and unnecessary information is not saved.

Magnetic Mode

Present disclosure magnetic mode processing shall be described for the flowcharts already described. With reference back to FIG. 3, the user may enable magnetic mode and disable magnetic mode as handled at block 360. For example, a user may enable magnetic mode with a gesture (implied search criteria, or search criteria specified at gesture time), and disable magnetic mode with a static gesture, similarly to as was described for blocks 306-308 and 312-316, except FIG. 5 summon action processing invoked at block 310 behaves differently because magnetic mode being enabled is indicated in criteria set at block 308. Once the data processing system is in magnetic mode, any detected input of the user interface (e.g. any touch to the touch sensitive display) causes objects satisfying the magnetic mode search criteria (can be any of the same search criteria as described above for static and dynamic summon gestures) to gravitate towards the currently active user input position (i.e. current touch position detected). When active user input detection ends (e.g. user no longer touches the touch sensitive display), objects return back to their original positions. Touches detected at block 304 cause invocation of magnetic mode object transition for currently active user interface objects matching the search criteria by invoking block 310 with the criteria also indicating magnetic mode is enabled. A soon as a touch is not detected, rollback processing already described for block 358 is immediately invoked to return objects back to where they were originally.

Further provided at block 360 is the ability for a user to confirm summoning the objects (e.g. static gesture for confirm while in magnetic mode) with disclosed summon gesture processing. Magnetic mode provides to the user a proposed result without a full summoning execution. The proposed result can then be confirmed by the user to perform complete summoning. Once the objects are confirmed to be summoned, a preferred embodiment disables magnetic mode automatically just prior to summoning objects (an alternate embodiment may keep magnetic mode enabled until the user explicitly disables the mode). When magnetic mode is confirmed for summoning as determined at block 360, processing continues directly to block 308 for subsequent normal summon action processing (i.e. no magnetic mode indicated) using search criteria as though magnetic mode was never used.

With reference to FIG. 5, magnetic mode processing (not a magnetic mode confirm) can be observed as follows:

A summoned list of block 536 is never presented for magnetic mode, thus processing always continues from block 518 to 520;

Only currently active user interface objects are affected by magnetic mode, while historical and future searches are not relevant; and Application processing of blocks 528 through 532 will never occur.

Thus, magnetic mode processing includes blocks 502, 504, 506, 508, 510, 512, 514, 516, 518, 520, 522, 524, 526, 546 and 548. With reference to FIG. 6, magnetic mode processing always involves currently active user interface objects. Thus, magnetic mode processing includes blocks 602, 604, 606, 608 and 612 through 630 (no block 610). With reference to FIG. 7, block 704 additionally accesses a magnetic mode indicator parameter passed by block 526 from criteria which causes different processing when magnetic mode is enabled. Processing of blocks 722 through 728, and blocks 716 through 718 use magnetic mode percentile field 450*i* for transitioning at a percentage of overall distance toward the detected user input position. Recommended values for field 450*i* are 25% to 80% so the gravitation of objects toward the cursor position (e.g. summoned position) is evident without bringing objects all the way to the cursor (i.e. a magnetic effect). Other TR 450 fields may be used, and some TR fields may be overridden to ensure desirable magnetic mode functionality (e.g. linear gravitation movement). For example, scaling and ghosting can still be used from the TR 450, but a non-linear mathematical function for the summon path may be overridden.

Magnetic mode provides a convenient way to identify objects of interest without cluttering a proposed summoned position until the user is ready to confirm the summoning of the object(s). There may also be a variety of user interface navigation scenarios where magnetic mode is useful.

Company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method in a data processing system for a user to summon a user interface object of a user interface of the data processing system, the method comprising:

displaying a plurality of user interface objects within the user interface;

recognizing a user search request by the user for a particular user interface object of the plurality of user interface objects as a summon of the particular user interface object toward a user touched cursor position of the user interface, the user search request specifying search criteria for the particular user interface object;

searching content associated with all active user interface objects of the data processing system based on the user search request specifying search criteria and identifying the particular user interface object as a result of the searching;

recognizing the user touched cursor position of the user interface that is a subject of the summon by the user to bring the particular user interface object of the plurality of user interface objects toward the user touched cursor position of the user interface, the user touched cursor position of the user interface being a summoned location identified by a particular point in the user interface specified by the user touched cursor position detected within the user interface;

automatically gravitating the particular user interface object a configured path percentage of movement completeness toward the summoned location of the user interface from a first location of the user interface in response to detecting the user touched cursor position detected within the user interface, the configured path percentage of movement completeness being relative to completely moving the particular user interface object from the first location of the user interface to the summoned location of the user interface; and enabling the user to perform at least one of:
moving the particular user interface object back to the first location in response to not detecting the user touched cursor position, or
presenting information for the particular user interface object at the summoned location of the user interface in response to a confirmation request.

2. The method of claim 1 wherein the user search request is specified with a written gesture.

3. The method of claim 2 wherein the written gesture includes a textual content search specification.

4. The method of claim 1 further including downloading the user search request from a remote service wherein a user previously uploaded the user search request to the remote service.

5. The method of claim 1 wherein the gravitating the particular user interface object the configured path percentage of movement completeness toward the summoned location of the user interface from the first location of the user interface comprises transitioning the particular user interface object using visual or audio animation.

6. The method of claim 1 wherein the user search request specifies search criteria used for searching data which was historically associated with the particular user interface object actively displayed to the user interface.

7. The method of claim 1 wherein the identifying the particular user interface object as a result of the searching comprises identifying the particular user interface object as being associated with at least one processing condition of the data processing system.

8. The method of claim 1 wherein the identifying the particular user interface object as a result of the searching comprises identifying the particular user interface object as having at least one specified presentation characteristic.

9. The method of claim 1 wherein the information comprises a group wherein each entry of the group comprises a search result user interface object, and wherein at least one entry of the group represents the particular user interface object.

10. The method of claim 1 wherein the gravitating the particular user interface object the configured path percentage of movement completeness toward the summoned location of the user interface from the first location of the user interface comprises transitioning the particular user interface object by scaling a size of the particular user interface object.

11. The method of claim 1 wherein the information is an exploded view of information associated to the particular user interface object.

12. The method of claim 1 wherein the information is a point of interest associated with the particular user interface object.

13. The method of claim 1 wherein the configured path percentage of movement completeness comprises a path less than a complete movement path between the first location of the user interface and the summoned location of the user interface.

14. A data processing system for a user to summon a user interface object, comprising:
one or more processors;
a user interface; and
memory coupled to the one or more processors, wherein the memory includes executable instructions which, when executed by the one or more processors, results in the system:
displaying a plurality of user interface objects within the user interface;
recognizing a user search request by the user for a particular user interface object of the plurality of user interface objects as a summon of the particular user interface object toward a user touched cursor position of the user interface, the user search request specifying search criteria for the particular user interface object;
searching content associated with all active user interface objects of the data processing system based on the user search request specifying search criteria and identifying the particular user interface object as a result of the searching;
recognizing the user touched cursor position of the user interface that is a subject of the summon by the user to bring the particular user interface object of the plurality of user interface objects toward the user touched cursor position of the user interface, the user touched cursor position of the user interface being a summoned location identified by a particular point in the user interface specified by the user touched cursor position detected within the user interface;
automatically gravitating the particular user interface object a configured path percentage of movement completeness toward the summoned location of the user interface from a first location of the user interface in response to detecting the user touched cursor position detected within the user interface, the configured path percentage of movement completeness being relative to completely moving the particular user interface object from the first location of the user interface to the summoned location of the user interface; and
enabling the user to perform at least one of:
moving the particular user interface object back to the first location in response to not detecting the user touched cursor position, or
presenting information for the particular user interface object at the summoned location of the user interface in response to a confirmation request.

15. The data processing system of claim 14 wherein the user search request is specified with a written gesture.

16. The data processing system of claim 15 wherein the written gesture includes a textual content search specification.

17. The data processing system of claim 14 further including processing for downloading the user search request from a remote service wherein a user previously uploaded the user search request to the remote service.

18. The data processing system of claim 14 wherein the gravitating the particular user interface object the configured path percentage of movement completeness toward the summoned location of the user interface from the first location of the user interface comprises transitioning the particular user interface object using visual or audio animation.

19. The data processing system of claim 14 wherein the user search request specifies search criteria used for searching data which was historically associated to the particular user interface object actively displayed to the user interface.

20. The data processing system of claim 14 wherein the identifying the particular user interface object as the result of the searching comprises identifying the particular user interface object as being associated with at least one processing condition of the data processing system.

21. The data processing system of claim 14 wherein the identifying the particular user interface object as the result of the searching comprises identifying the particular user interface object as having at least one specified presentation characteristic.

22. The data processing system of claim 14 wherein the information comprises a group wherein each entry of the group comprises a search result user interface object, and wherein at least one entry of the group represents the particular user interface object.

23. The data processing system of claim 14 wherein the gravitating the particular user interface object the configured path percentage of movement completeness toward the summoned location of the user interface from the first location of the user interface comprises transitioning the particular user interface object by scaling a size of the particular user interface object.

24. The data processing system of claim 14 wherein the information is an exploded view of information associated with the particular user interface object.

25. The data processing system of claim 14 wherein the information is a point of interest associated with the particular user interface object.

26. The data processing system of claim 14 wherein the configured path percentage of movement completeness comprises a path less than a complete movement path between the first location of the user interface and the summoned location of the user interface.

27. A method in a data processing system for a user of a window user interface of the data processing system to summon a user interface object, the method comprising:
   accepting, from the user of the window user interface, a user search request having user specified search criteria for searching object data of user interface objects presently displayed within the window user interface, the user specified search criteria specified independently of any of the user interface objects presently displayed within the window user interface;
   searching the object data of all of the user interface objects presently displayed within the window user interface according to the user specified search criteria and identifying a particular user interface object having the object data matching the user specified search criteria specified independently of any of the user interface objects presently displayed within the window user interface;
   detecting a user touch by the user to the window user interface, the user touch correlated to a user touched cursor position for determining a user interface coordinate system point made equivalent to a summoned location of the window user interface without consideration of any of the user interface objects presently displayed within the window user interface;
   upon determining the user interface coordinate system point made equivalent to the summoned location, automatically gravitating the particular user interface object a configured path percentage of movement completeness toward the summoned location of the window user interface from a first location of the window user interface wherein the first location is an originally displayed position of the particular user interface object in the window user interface; and
   performing at least one of:
      returning the particular user interface object back to the originally displayed position in response to no longer detecting the user touch wherein detecting another user touch to the window user interface subsequent to the no longer detecting the user touch results in another processing of the automatically gravitating, or
      presenting information for the particular user interface object at the summoned location of the window user interface in response to a confirmation request.

28. The method of claim 27 wherein the user search request is specified with a written gesture.

29. The method of claim 28 wherein the written gesture includes a textual content search specification.

30. The method of claim 27 further including downloading the user search request from a remote service wherein a user previously uploaded the user search request to the remote service.

31. The method of claim 27 wherein the gravitating the particular user interface object the configured path percentage of movement completeness toward the summoned location of the window user interface from the first location of the window user interface comprises transitioning the particular user interface object using visual or audio animation.

32. The method of claim 27 wherein the user search request specifies search criteria used for searching data which was historically associated with the particular user interface object actively displayed to the window user interface.

33. The method of claim 27 wherein the identifying the particular user interface object comprises identifying the particular user interface object as being associated with at least one processing condition of the data processing system.

34. The method of claim 27 wherein the identifying the particular user interface object comprises identifying the particular user interface object as having at least one specified presentation characteristic.

35. The method of claim 27 wherein the information comprises a group wherein each entry of the group comprises a search result user interface object, and wherein at least one entry of the group represents the particular user interface object.

36. The method of claim 27 wherein the gravitating the particular user interface object the configured path percentage of movement completeness toward the summoned location of the window user interface from the first location of the window user interface comprises transitioning the particular user interface object by scaling a size of the particular user interface object.

37. The method of claim 27 wherein the information is an exploded view of information associated with the particular user interface object.

38. The method of claim 27 wherein the information is a point of interest associated with the particular user interface object.

39. The method of claim 27 wherein the configured path percentage of movement completeness comprises a path less than a complete movement path between the first location of the window user interface and the summoned location of the window user interface.

40. A data processing system for a user to summon a user interface object, comprising:
   one or more processors;
   a user interface; and
   memory coupled to the one or more processors, wherein the memory includes executable instructions which, when executed by the one or more processors, results in the system:
      accepting, from the user of the window user interface, a user search request having user specified search criteria for searching object data of user interface objects presently displayed within the window user interface, the user specified search criteria specified independently of any of the user interface objects presently displayed within the window user interface;

searching the object data of all of the user interface objects presently displayed within the window user interface according to the user specified search criteria and identifying a particular user interface object having the object data matching the user specified search criteria specified independently of any of the user interface objects presently displayed within the window user interface;

detecting a user touch by the user to the window user interface, the user touch correlated to a user touched cursor position for determining a user interface coordinate system point made equivalent to a summoned location of the window user interface without consideration of any of the user interface objects presently displayed within the window user interface;

upon determining the user interface coordinate system point made equivalent to the summoned location, automatically gravitating the particular user interface object a configured path percentage of movement completeness toward the summoned location of the window user interface from a first location of the window user interface wherein the first location is an originally displayed position of the particular user interface object in the window user interface; and performing at least one of:

returning the particular user interface object back to the originally displayed position in response to no longer detecting the user touch wherein detecting another user touch to the window user interface subsequent to the no longer detecting the user touch results in another processing of the automatically gravitating, or presenting information for the particular user interface object at the summoned location of the window user interface in response to a confirmation request.

41. The data processing system of claim 40 wherein the user search request is specified with a written gesture.

42. The data processing system of claim 41 wherein the written gesture includes a textual content search specification.

43. The data processing system of claim 40 further including processing for downloading the user search request from a remote service wherein a user previously uploaded the user search request to the remote service.

44. The data processing system of claim 40 wherein the gravitating the particular user interface object the configured path percentage of movement completeness toward the summoned location of the window user interface from the first location of the window user interface comprises transitioning the particular user interface object using visual or audio animation.

45. The data processing system of claim 40 wherein the user search request specifies search criteria used for searching data which was historically associated with the particular user interface object actively displayed to the window user interface.

46. The data processing system of claim 40 wherein the identifying the particular user interface object comprises identifying the particular user interface object as being associated with at least one processing condition of the data processing system.

47. The data processing system of claim 40 wherein the identifying the particular user interface object comprises identifying the particular user interface object as having at least one specified presentation characteristic.

48. The data processing system of claim 40 wherein the information comprises a group wherein each entry of the group comprises a search result user interface object, and wherein at least one entry of the group represents the particular user interface object.

49. The data processing system of claim 40 wherein the gravitating the particular user interface object the configured path percentage of movement completeness toward the summoned location of the window user interface from the first location of the window user interface comprises transitioning the particular user interface object by scaling a size of the particular user interface object.

50. data processing system of claim 40 wherein the information is an exploded view of information associated with the particular user interface object.

51. The data processing system of claim 40 wherein the information is a point of interest associated with the particular user interface object.

52. The data processing system of claim 40 wherein the configured path percentage of movement completeness comprises a path less than a complete movement path between the first location of the window user interface and the summoned location of the window user interface.

* * * * *